US012726808B2

(12) United States Patent
Feng et al.

(10) Patent No.: US 12,726,808 B2
(45) Date of Patent: Sep. 1, 2026

(54) COMMUNICATION METHOD AND COMMUNICATION APPARATUS

(71) Applicant: HUAWEI TECHNOLOGIES CO., LTD., Shenzhen (CN)

(72) Inventors: Zhao Feng, Shanghai (CN); Yang Xin, Shanghai (CN); Yuan Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 265 days.

(21) Appl. No.: 18/646,198

(22) Filed: Apr. 25, 2024

(65) Prior Publication Data

US 2024/0276197 A1 Aug. 15, 2024

Related U.S. Application Data

(63) Continuation of application No. PCT/CN2022/124496, filed on Oct. 11, 2022.

(30) Foreign Application Priority Data

Oct. 27, 2021 (CN) ......................... 202111255324.6

(51) Int. Cl.
*H04W 8/14* (2009.01)
*H04W 8/20* (2009.01)
*H04W 64/00* (2009.01)

(52) U.S. Cl.
CPC ............... *H04W 8/14* (2013.01); *H04W 8/20* (2013.01); *H04W 64/003* (2013.01)

(58) Field of Classification Search
CPC ....... H04W 8/14; H04W 8/20; H04W 64/003; H04W 48/14; H04W 88/14; H04W 48/16;
(Continued)

(56) References Cited

U.S. PATENT DOCUMENTS

2021/0160149 A1* 5/2021 Ma .......................... H04L 41/12
2021/0314906 A1* 10/2021 Matolia ............... H04W 64/003
(Continued)

FOREIGN PATENT DOCUMENTS

CN 111901367 A 11/2020
WO 2023071770 A1 5/2023

OTHER PUBLICATIONS

3GPP TR 23.700-80, "3rd Generation Partnership Project; Technical Specification Group Services and System Aspects; Study on 5G System Support for AI/ML-Based Services (Release 18)", 3GPP Organizational Partners, V1.0.0, Technical Report, Sep. 2022, 208 pages.
(Continued)

*Primary Examiner* — Lana N Le
(74) *Attorney, Agent, or Firm* — Maier & Maier, PLLC

(57) ABSTRACT

A communication method and a communication apparatus. The method includes: a first network element obtains information about an analytics type requested by a terminal device; the first network element obtains information about an analytics type to which the terminal device subscribes; the first network element obtains information about an analytics type supported by a data analytics network element; the first network element determines information about an analytics type that is allowed to be requested by the terminal device based on the information about the analytics type requested by the terminal device, the information about the analytics type to which the terminal device subscribes, and the information about the analytics type supported by the data analytics network element; and the first network element sends, to the terminal device, the information about the analytics type that is allowed to be requested by the terminal device.

12 Claims, 14 Drawing Sheets

(58) Field of Classification Search
CPC ....... H04W 8/18; H04W 8/205; H04W 48/18; H04W 24/08; H04W 4/029; H04W 64/00; H04W 4/021; H04W 72/20; H04L 41/12; H04L 41/14
See application file for complete search history.

(56) References Cited

U.S. PATENT DOCUMENTS

2022/0060388 A1* 2/2022 Li ......................... H04W 24/08
2023/0198853 A1 6/2023 Lee et al.
2024/0323886 A1* 9/2024 Hoffner ................... H04W 8/20
2025/0185086 A1* 6/2025 Kim ........................ H04L 41/14

OTHER PUBLICATIONS

3GPP TS 23.288, "3rd Generation Partnership Project; Technical Specification Group Services and System Aspects; Architecture Enhancements for 5G System (5GS) to Support Network Data Analytics Services (Release 17)", 3GPP Organizational Partners, Sep. 2021, V17.2.0, 196 pages.
Oppo et al., "New SID on 5G System Support for AI/ML-Based Services", SA WG2 Meeting #146e (e-meeting), S2-2105450, Aug. 16-27, 2021, 4 pages.
China Mobile et al., "Study on Enablers for Network Automation for 5G-phase 3", 3GPP TSG-WG SA2 Meeting #146E e-meeting, S2-2106147, Aug. 16-27, 2021, 4 pages.

* cited by examiner

COMMUNICATION METHOD AND COMMUNICATION APPARATUS

CROSS-REFERENCE TO RELATED APPLICATIONS

This application is a continuation of International Application No. PCT/CN2022/124496, filed on Oct. 11, 2022, which claims priority to Chinese Patent Application No. 202111255324.6, filed on Oct. 27, 2021. The disclosures of the aforementioned applications are hereby incorporated by reference in their entireties.

TECHNICAL FIELD

The embodiments relate to the communication field, a communication method, and a communication apparatus.

BACKGROUND

A network data analytics function (NWDAF) network element may be configured to: obtain data generated by a terminal device on a network-side network element (for example, an access and mobility management function network element, or a session management function network element), and provide a data analytics result, a model (for example, a machine learning model), data, and the like for another network-side network element (for example, a policy control function network element). However, the 3rd Generation Partnership Project (3GPP) does not provide a method for the terminal device to obtain the data analytics result from the NWDAF.

SUMMARY

The embodiments provide a communication method and a communication apparatus, so that a terminal device can obtain a data analytics result from an NWDAF.

According to a first aspect, a communication method is provided. The method includes: A first network element obtains information about an analytics type requested by a terminal device; the first network element obtains information about an analytics type to which the terminal device subscribes; the first network element obtains information about an analytics type supported by a data analytics network element; the first network element determines an analytics type that is allowed to be requested by the terminal device based on the information about the analytics type requested by the terminal device, the information about the analytics type to which the terminal device subscribes, and the information about the analytics type supported by the data analytics network element; and the first network element sends, to the terminal device, the analytics type that is allowed to be requested by the terminal device.

According to the communication method provided in the embodiments, the first network element may determine, based on the analytics type requested by the terminal device, the analytics type to which the terminal device subscribes, and the analytics type supported by the data analytics network element, an analytics type that is allowed to be obtained by the terminal device, and send, to the terminal device, the analytics type that is allowed to be obtained by the terminal device, so that the terminal device can obtain a data analytics result from the data analytics network element.

With reference to the first aspect, in some implementations of the first aspect, the analytics type that is allowed to be requested by the terminal device is an intersection of the analytics type requested by the terminal device, the analytics type to which the terminal device subscribes, and the analytics type supported by the data analytics network element.

With reference to the first aspect, in some implementations of the first aspect, the first network element is an access and mobility management function network element, a session management function network element, a user plane function network element, or an application function network element. The first network element sends a first request message to a network repository function network element, where the first request message is used to request information about a data analytics network element, the first request message includes information about an area of interest of the terminal device and/or information about a location area in which the terminal device is located, and a service area of the data analytics network element includes the area of interest and/or the location area in which the terminal device is located. The first network element receives the information about the data analytics network element from the network repository function network element, where the information about the data analytics network element includes the information about the analytics type supported by the data analytics network element.

With reference to the first aspect, in some implementations of the first aspect, the first network element is an access and mobility management function network element, a session management function network element, a user plane function network element, or an application function network element. The first network element sends a first request message to a network repository function network element, where the first request message is used to request information about a data analytics network element, the first request message includes information about an area of interest of the terminal device and/or information about a location area in which the terminal device is located, and a service area of the data analytics network element includes the area of interest and/or the location area in which the terminal device is located. The first network element receives the information about the data analytics network element from the network repository function network element, where the information about the data analytics network element includes address information of the data analytics network element. The first network element obtains, from the data analytics network element based on the address information, the information about the analytics type supported by the data analytics network element.

With reference to the first aspect, in some implementations of the first aspect, the first network element is an access and mobility management function network element, a session management function network element, or a user plane function network element. The first network element sends a second request message to a unified data management network element or an application function network element, where the second request message is used to request subscription data of the terminal device, and the second request message includes identification information of the terminal device. The first network element receives, from the unified data management network element or the application function network element, the information about the analytics type to which the terminal device subscribes.

With reference to the first aspect, in some implementations of the first aspect, the first network element is a session management function network element or a user plane function network element. The second request message further includes identification information of an application of the terminal device. The information that is received by the first network element and that is about the analytics type to which the terminal device subscribes corresponds to the identification information of the application of the terminal device.

With reference to the first aspect, in some implementations of the first aspect, the first network element is a network repository function network element. The first network element obtains a first request message from an access and mobility management function network element, a session management function network element, a user plane function network element, or an application function network element, where the first request message includes the information about the analytics type requested by the terminal device and the information about the analytics type to which the terminal device subscribes.

With reference to the first aspect, in some implementations of the first aspect, the first request message further includes information about an area of interest of the terminal device and/or information about a location area in which the terminal device is located. The first network element determines the data analytics network element based on the information about the area of interest of the terminal device and/or the information about the location area in which the terminal device is located, where a service area of the data analytics network element includes the area of interest and/or the location area in which the terminal device is located. The first network element determines the information about the analytics type supported by the data analytics network element.

With reference to the first aspect, in some implementations of the first aspect, the first network element is a session management function network element. The first network element obtains, via a user plane function network element, the information about the analytics type requested by the terminal device.

With reference to the first aspect, in some implementations of the first aspect, the first network element receives indication information from the terminal device, where the indication information indicates that the information about the analytics type requested by the terminal device is carried in a user plane uplink data packet. The first network element sends a packet detection rule corresponding to the user plane uplink data packet to the user plane function network element based on the indication information.

The indication information may explicitly indicate that the terminal device carries the information about the analytics type requested by the terminal device in the user plane uplink data packet. For example, the indication information is 1-bit information. When the bit is “0”, the indication information indicates that the terminal device carries the information about the analytics type requested by the terminal device in the user plane uplink data packet. Alternatively, when the bit is “1”, the indication information indicates that the terminal device carries the information about the analytics type requested by the terminal device in the user plane uplink data packet. The indication information may be named as an analytic subscription indication. Alternatively, the indication information may implicitly indicate that the terminal device carries the information about the analytics type requested by the terminal device in the user plane uplink data packet. For example, the indication information is a preset data network name (DNN) and/or single network slice selection assistance information (S-NSSAI). If a session establishment/modification request message from the terminal device to a session management network element includes the preset DNN and/or the S-NSSAI, the session management network element determines, based on the preset DNN and/or the S-NSSAI, that the terminal device carries first information in the user plane uplink data packet.

The packet detection rule corresponding to the user plane uplink data packet is used to forward the information about the analytics type requested by the terminal device to the session management network element. The user plane function network element receives the user plane uplink data packet from the terminal device. If the user plane uplink data packet includes the information about the analytics type requested by the terminal device, the user plane function network element sends the user plane uplink data packet to the session management network element according to the packet detection rule. For example, the packet detection rule includes a correspondence between a quality of service (QoS) flow identifier (QFI) and address information of the session management network element. The QFI is used to identify a QoS flow of a session in which the terminal device sends the first information and receives the data analytics result. Correspondingly, the user plane function network element determines, based on the correspondence between the QFI of the QoS flow of the user plane uplink data packet and the address information of the session management network element, to send the user plane uplink data packet to the session management network element.

With reference to the first aspect, in some implementations of the first aspect, the first network element is an application function network element. The first network element receives an application layer uplink data packet from the terminal device, where the application layer uplink data packet includes the information about the analytics type requested by the terminal device.

With reference to the first aspect, in some implementations of the first aspect, the application layer uplink data packet further includes Internet protocol (IP) address information of the terminal device. The first network element obtains an identifier of the terminal device from a binding support function network element based on the IP address information. For example, the identification information of the terminal device is a subscription permanent identifier (SUPI) or a generic public subscription identifier (GPSI). The first network element determines, based on the identification information of the terminal device, the information about the analytics type to which the terminal device subscribes.

With reference to the first aspect, in some implementations of the first aspect, the first network element sends an application layer downlink data packet to the terminal device, where the application layer downlink data packet includes the information about the analytics type that is allowed to be requested by the terminal device.

According to a second aspect, a communication method is provided. The method includes: sending, to a first network element, information about an analytics type requested by a terminal device; receiving, from the first network element, information about an analytics type that is allowed to be requested by the terminal device, where the analytics type that is allowed to be requested by the terminal device is an intersection of the analytics type requested by the terminal device, an analytics type to which the terminal device subscribes, and an analytics type supported by a data analytics network element; and requesting a data analytics result from the data analytics network element based on the information about the analytics type that is allowed to be requested by the terminal device.

According to the communication method, the terminal device sends, to the first network element, the information about the analytics type requested by the terminal device, and receives, from the first network element, the information about the analytics type that is allowed to be requested by the terminal device. The analytics type that is allowed to be requested by the terminal device is an intersection of the analytics type requested by the terminal device, the analytics type to which the terminal device subscribes, and the analytics type supported by the data analytics network element. The terminal device may obtain the data analytics result from the data analytics network element based on the information about the analytics type that is allowed to be requested by the terminal device.

With reference to the second aspect, in some implementations of the second aspect, the terminal device sends information about an area of interest of the terminal device to the first network element, where the information about the area of interest of the terminal device is used to determine the data analytics network element, and a service area of the data analytics network element includes the area of interest.

With reference to the second aspect, in some implementations of the second aspect, the first network element is an access and mobility management function network element, a session management function network element, a user plane function network element, or an application function network element.

With reference to the second aspect, in some implementations of the second aspect, the first network element is a network repository function network element. The terminal device sends, to the first network element via an access and mobility management function network element, a session management function network element, a user plane function network element, or an application function network element, the information about the analytics type requested by the terminal device.

With reference to the second aspect, in some implementations of the second aspect, the first network element is a session management function network element. The terminal device sends, to the first network element via a user plane function network element, the information about the analytics type requested by the terminal device.

With reference to the second aspect, in some implementations of the second aspect, the terminal device sends indication information to the first network element, where the indication information indicates that the information about the analytics type requested by the terminal device is carried in a user plane uplink data packet.

With reference to the second aspect, in some implementations of the second aspect, the first network element is an application function network element. The terminal device sends an application layer uplink data packet to the first network element, where the application layer uplink data packet includes the information about the analytics type requested by the terminal device.

With reference to the second aspect, in some implementations of the second aspect, the application layer uplink data packet further includes Internet protocol IP address information of the terminal device, and the IP address information is used by the first network element to obtain the information about the analytics type to which the terminal device subscribes.

With reference to the second aspect, in some implementations of the second aspect, the terminal device receives an application layer downlink data packet from the first network element, where the application layer downlink data packet includes the information about the analytics type that is allowed to be requested by the terminal device.

According to a third aspect, a communication apparatus is provided. The communication apparatus includes: a transceiver unit, where the transceiver unit is configured to: obtain information about an analytics type requested by a terminal device; obtain information about an analytics type to which the terminal device subscribes; and obtain information about an analytics type supported by a data analytics network element; and a processing unit, configured to determine information about an analytics type that is allowed to be requested by the terminal device based on the information about the analytics type requested by the terminal device, the information about the analytics type to which the terminal device subscribes, and the information about the analytics type supported by the data analytics network element. The transceiver unit is further configured to send, to the terminal device, the information about the analytics type that is allowed to be requested by the terminal device.

With reference to the third aspect, in some implementations of the third aspect, the transceiver unit may be configured to: send a first request message to a network repository function network element, where the first request message is used to request information about a data analytics network element, the first request message includes information about an area of interest of the terminal device and/or information about a location area in which the terminal device is located, and a service area of the data analytics network element includes the area of interest and/or the location area in which the terminal device is located; and receive the information about the data analytics network element from the network repository function network element, where the information about the data analytics network element includes the information about the analytics type supported by the data analytics network element.

With reference to the third aspect, in some implementations of the third aspect, the transceiver unit may be configured to: send a first request message to a network repository function network element, where the first request message is used to request information about a data analytics network element, the first request message includes information about an area of interest of the terminal device and/or information about a location area in which the terminal device is located, and a service area of the data analytics network element includes the area of interest and/or the location area in which the terminal device is located; receive the information about the data analytics network element from the network repository function network element, where the information about the data analytics network element includes address information of the data analytics network element; and obtain from the data analytics network element based on the address information, the information about the analytics type supported by the data analytics network element.

With reference to the third aspect, in some implementations of the third aspect, the transceiver unit may be configured to send a second request message to a unified data management network element or an application function network element, where the second request message is used to request subscription data of the terminal device, and the second request message includes identification information of the terminal device; and receive, from the unified data management network element or the application function network element, the information about the analytics type to which the terminal device subscribes.

With reference to the third aspect, in some implementations of the third aspect, the second request message further includes identification information of an application of the terminal device, and the information about the analytics type to which the terminal device subscribes corresponds to the identification information of the application of the terminal device.

With reference to the third aspect, in some implementations of the third aspect, the transceiver unit may be configured to obtain a first request message from an access and mobility management function network element, a session management function network element, a user plane function network element, or an application function network element, where the first request message includes the information about the analytics type requested by the terminal device and the information about the analytics type to which the terminal device subscribes.

With reference to the third aspect, in some implementations of the third aspect, the first request message further includes information about an area of interest of the terminal device and/or information about a location area in which the terminal device is located. The processing unit may be configured to: determine the data analytics network element based on the information about the area of interest of the terminal device and/or the information about the location area in which the terminal device is located, where a service area of the data analytics network element includes the area of interest and/or the location area in which the terminal device is located; and determine the information about the analytics type supported by the data analytics network element.

With reference to the third aspect, in some implementations of the third aspect, the transceiver unit may be configured to obtain, via a user plane function network element, the information about the analytics type requested by the terminal device.

With reference to the third aspect, in some implementations of the third aspect, the transceiver unit may be configured to receive indication information from the terminal device, where the indication information indicates that the information about the analytics type requested by the terminal device is carried in a user plane uplink data packet. The processing unit may be configured to send a packet detection rule corresponding to the user plane uplink data packet to the user plane function network element based on the indication information.

With reference to the third aspect, in some implementations of the third aspect, the transceiver unit may be configured to receive an application layer uplink data packet from the terminal device, where the application layer uplink data packet includes the information about the analytics type requested by the terminal device.

With reference to the third aspect, in some implementations of the third aspect, the application layer uplink data packet further includes Internet protocol IP address information of the terminal device. The processing unit may be configured to: obtain identification information of the terminal device from a binding support function network element based on the IP address information; and determine, based on the identification information of the terminal device, the information about the analytics type to which the terminal device subscribes.

With reference to the third aspect, in some implementations of the third aspect, the transceiver unit may be configured to send an application layer downlink data packet to the terminal device, where the application layer downlink data packet includes the information about the analytics type that is allowed to be requested by the terminal device.

According to a fourth aspect, a communication apparatus is provided. The communication apparatus includes: a transceiver unit, where the transceiver unit is configured to receive, from a first network element, information about an analytics type that is allowed to be requested by a terminal device, where the analytics type that is allowed to be requested by the terminal device is an intersection of the analytics type requested by the terminal device; an analytics type to which the terminal device subscribes, and an analytics type supported by a data analytics network element; and a processing unit, configured to request a data analytics result from the data analytics network element based on the information about the analytics type that is allowed to be requested by the terminal device.

With reference to the fourth aspect, in some implementations of the fourth aspect, the transceiver unit is further configured to send information about an area of interest of the terminal device to the first network element, where the information about the area of interest of the terminal device is used to determine the data analytics network element, and a service area of the data analytics network element includes the area of interest.

With reference to the fourth aspect, in some implementations of the fourth aspect, the first network element is an access and mobility management function network element, a session management function network element, a user plane function network element, or an application function network element.

With reference to the fourth aspect, in some implementations of the fourth aspect, the first network element is a network repository function network element. When sending, to the first network element, the information about the analytics type requested by the terminal device, the transceiver unit may be configured to send, to the first network element via an access and mobility management function network element, a session management function network element, a user plane function network element, or an application function network element, the information about the analytics type requested by the terminal device.

With reference to the fourth aspect, in some implementations of the fourth aspect, the first network element is a session management function network element. The transceiver unit may be configured to send, to the first network element via a user plane function network element, the information about the analytics type requested by the terminal device.

With reference to the fourth aspect, in some implementations of the fourth aspect, the transceiver unit may be configured to send indication information to the first network element, where the indication information indicates that the information about the analytics type requested by the terminal device is carried in a user plane uplink data packet.

With reference to the fourth aspect, in some implementations of the fourth aspect, the first network element is an application function network element. The transceiver unit may be configured to send an application layer uplink data packet to the first network element, where the application layer uplink data packet includes the information about the analytics type requested by the terminal device.

With reference to the fourth aspect, in some implementations of the fourth aspect, the application layer uplink data packet further includes Internet protocol IP address information of the terminal device, and the IP address information is used by the first network element to obtain the information about the analytics type to which the terminal device subscribes.

With reference to the fourth aspect, in some implementations of the fourth aspect, the transceiver unit may be configured to receive an application layer downlink data packet from the first network element, where the application layer downlink data packet includes the information about the analytics type that is allowed to be requested by the terminal device.

According to a fifth aspect, a communication apparatus is provided, including a processor. The processor is coupled to a memory and may be configured to execute instructions in the memory, to implement the method according to any one of the first aspect and the possible implementations of the first aspect. For example, the communication apparatus further includes the memory. The communication apparatus further includes a communication interface. The processor is coupled to the communication interface.

In an implementation, the communication apparatus is a first network element. When the communication apparatus is the first network element, the communication interface may be a transceiver or an input/output interface.

In another implementation, the communication apparatus is a chip disposed in a first network element. When the communication apparatus is the chip configured in the first network element, the communication interface may be an input/output interface.

For example, the transceiver may be a transceiver circuit. The input/output interface may be an input/output circuit.

According to a sixth aspect, a communication apparatus is provided, including a processor. The processor is coupled to a memory and may be configured to execute instructions in the memory, to implement the method according to any one of the second aspect and the possible implementations of the second aspect. For example, the communication apparatus further includes the memory. The communication apparatus further includes a communication interface. The processor is coupled to the communication interface.

In an implementation, the communication apparatus is a terminal device. When the communication apparatus is the terminal device, the communication interface may be a transceiver or an input/output interface.

In another implementation, the communication apparatus is a chip configured in a terminal device. When the communication apparatus is the chip configured in the terminal device, the communication interface may be an input/output interface.

For example, the transceiver may be a transceiver circuit. The input/output interface may be an input/output circuit.

According to a seventh aspect, a processor is provided, including an input circuit, an output circuit, and a processing circuit. The processing circuit is configured to receive a signal by using the input circuit, and transmit a signal by using the output circuit, so that the processor performs the method according to any one of the possible implementations of the first aspect and the second aspect.

In an implementation process, the processor may be one or more chips, the input circuit may be an input pin, the output circuit may be an output pin, and the processing circuit may be a transistor, a gate circuit, a trigger, any logic circuit, or the like. An input signal received by the input circuit may be, for example but not limited to, received and input by a receiver. A signal output by the output circuit may be, for example but not limited to, output to a transmitter and transmitted by the transmitter. The input circuit and the output circuit may be a same circuit, where the circuit is used as an input circuit or an output circuit in different time. Implementations of the processor and various circuits are not limited in the embodiments.

According to an eighth aspect, a processing apparatus is provided, including a processor and a memory. The processor is configured to: read instructions stored in the memory, receive a signal via a receiver, transmit a signal via a transmitter, and perform the method according to any one of the possible implementations of the first aspect and the second aspect.

For example, there may be one or more processors, and there may be one or more memories.

For example, the memory may be integrated with the processor, or the memory and the processor are separately disposed.

In an implementation process, the memory may be a non-transitory memory, such as a read-only memory (ROM). The memory and the processor may be integrated into one chip or may be separately disposed on different chips. A type of the memory and a manner in which the memory and the processor are disposed are not limited in the embodiments.

A related data exchange process such as sending of indication information may be a process of outputting the indication information from the processor, and receiving of capability information may be a process of receiving the input capability information by the processor. Data output by the processor may be output to the transmitter, and input data received by the processor may be from the receiver. The transmitter and the receiver may be collectively referred to as a transceiver.

The processing apparatus in the eighth aspect may be one or more chips. The processor in the processing apparatus may be implemented by using hardware or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated into the processor or may be located outside the processor and exist independently.

According to a ninth aspect, a computer program product is provided. The computer program product includes a computer program (which may also be referred to as code or instructions). When the computer program is run, a computer is enabled to perform the method according to any one of the possible implementations in the first aspect and the second aspect.

According to a tenth aspect, a non-transitory computer-readable storage medium is provided. The non-transitory computer-readable storage medium stores a computer program (which may also be referred to as code or instructions). When the computer program runs on a computer, the method according to any one of the possible implementations of the first aspect and the second aspect is performed.

According to an eleventh aspect, a communication system is provided, including the foregoing first network element and the second network element communicating with the first network element. The first network element is an access and mobility management function network element, a session management function network element, a user plane function network element, an application function network element, or a network repository function network element. The second network element is a unified data management network element.

DETAILED DESCRIPTION OF EMBODIMENTS

The following describes the embodiments with reference to accompanying drawings.

The embodiments may be applied to various communication systems, for example: long term evolution (LTE) system, LTE frequency division duplex (FDD) system, LTE time division duplex (TDD), worldwide interoperability for microwave access (WiMAX) communication system, 5th generation (5G) communication system or future communication system, for example, a 6th generation (6G) communication system, vehicle-to-x (V2X), where V2X may include vehicle-to-network (V2N), vehicle-to-vehicle (V2V), vehicle-to-infrastructure (V2I), vehicle-to-pedestrian (V2P), long term evolution-vehicle (LTE-V) for workshop communication, internet of vehicles, machine type communication (MTC), internet of things (IoT), long term evolution-machine (LTE-M), machine to machine (M2M).

Figure 1:
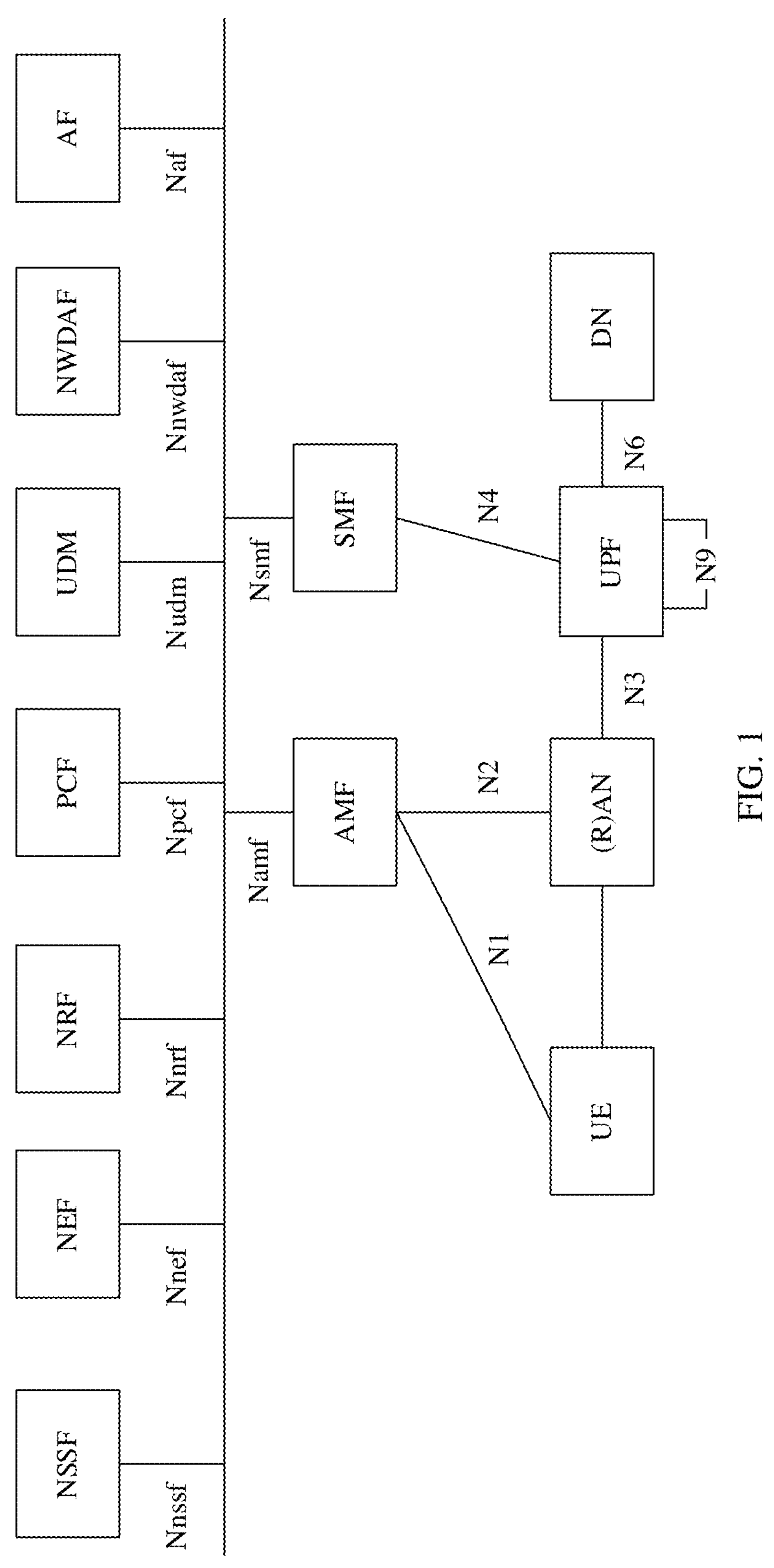
FIG. 1 is a schematic diagram of an application scenario to which a method according to an embodiment is applicable.

FIG. 1 is a schematic diagram of a network architecture applicable to a method according to an embodiment. The network architecture may further include the following network elements:

1. User equipment (UE) may include various handheld devices with a wireless communication function, vehicle-mounted devices, wearable devices, computing devices, or other processing devices connected to a wireless modem, and various forms of terminals, mobile stations (MSs), terminals, soft clients, or the like, for example, water meters, electricity meters, and sensors.

For example, user equipment in the embodiments may be an access terminal, a user unit, a user station, a mobile station, a mobile console, a relay station, a remote station, a remote terminal, a mobile device, a user terminal, a terminal equipment, a wireless communication device, a user agent, or a user apparatus. The user equipment may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, user equipment in a 5G network, user equipment in a future evolved public land mobile network (PLMN), user equipment in the future internet of vehicles, or the like. This is not limited.

As an example rather than a limitation, in the embodiments, the wearable device may also be referred to as a wearable intelligent device and is a general name of a wearable device developed by intelligently designing daily wear via a wearable technology, such as glasses, gloves, watches, clothing, and shoes. The wearable device is a portable device that is directly worn on a body or integrated into clothes or an accessory of a user. Wearable devices are not only hardware devices, and can implement powerful functions via software support, data interaction, and cloud interaction. In a broad sense, intelligent wearable devices include full-featured and large-size devices that can implement complete or partial functions without depending on smartphones, for example, smart watches or smart glasses, and devices that dedicated to only one type of application and need to be used together with other devices such as smartphones, such as various smart bands or smart jewelry used for monitoring physical signs.

In addition, the user equipment in the embodiments may alternatively be a user equipment in the Internet of Things (IoT) system. IoT is an important part of development of future information technologies. A feature of the IoT is to connect an object to a network by using a communication technology, to implement an intelligent network of human-machine interconnection and thing-thing interconnection. In the embodiments, an IoT technology may implement massive connections, deep coverage, and terminal power saving by using, for example, a narrowband (NB) technology. In addition, in the embodiments, the user equipment may further include sensors such as a smart printer, a train detector, and a gas station. Main functions include: collecting data (some user equipment), receiving control information and downlink data of an access network device, sending an electromagnetic wave, and transmitting uplink data to the access network device.

2. A radio access network (RAN) device is configured to provide a network access function for authorized user equipment in an area and can use transmission tunnels of different quality based on user equipment levels, service requirements, or the like.

The RAN can manage a radio resource and provide an access service to user equipment, to complete forwarding of a control signal and user equipment data between the user equipment and a core network. The RAN may also be understood as a base station in a conventional network.

For example, the access network device in the embodiments may be any communication device with a wireless transceiver function for communicating with the user equipment. The access network device includes, but is not limited to: an evolved NodeB (eNB), a baseband unit (BBU), and an access point (AP), a wireless relay node, a wireless backhaul node, a transmission point (TP), or a transmission and reception point (TRP) in a wireless fidelity (Wi-Fi) system, or the like, it may be 5G, for example, NR, a gNB in a system, or a transmission point (TRP or TP), one or a group of antenna panels (including a plurality of antenna panels) of base stations in the 5G system, or it may be a network node that forms a gNB or a transmission point, for example, a baseband unit (BBU), a distributed unit (DU).

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service and implements functions of a radio resource control (RRC) layer and a packet data convergence protocol (PDCP) layer. The DU is responsible for processing a physical layer protocol and a real-time service and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer or is converted from information at the PHY layer. Therefore, in this architecture, higher layer signaling such as RRC layer signaling may also be considered as being from the DU or from the DU and the AAU. It may be understood that the access network device may be a device including one or more of a CU node, a DU node, or an AAU node. In addition, the CU may be classified as an access network device in an access network (RAN), or the CU may be classified as an access network device in the core network (CN). This is not limited.

3. A user plane function (UPF) network element is used for packet routing and forwarding, quality of service (QOS) handling for user plane data, and the like. User data may be accessed to a data network (DN) via this network element. In the embodiments, the user plane function network element may be configured to implement a function of a user plane network element.
4. A data network (DN) is configured to provide a network for data transmission, for example, an operator service network, the Internet, and a third-party service network.
5. An authentication server function (AUSF) network element can be configured for user authentication and the like.
6. An access and mobility management function (AMF) network element can be configured for mobility management, access management, and the like, and may further be configured to implement a function other than session management in functions of a mobility management entity (MME), for example, a function of access authorization/authentication.
7. A session management function (SMF) network element can be configured for session management, allocation and management of Internet protocol (IP) addresses of terminal devices, selection and management of a user plane function, a termination point of a policy control and charging function interface, downlink data notification, and the like.
8. A policy control function (PCF) network element is a unified policy framework configured to guide network behavior and provide policy rule information for a network element (for example, an AMF network element or an SMF network element) or a terminal device.
9. A network repository function (NRF) network element is configured to store description information of a network function entity and a service provided by the network function entity, and support service discovery, network element entity discovery, and the like.
10. A network exposure function (NEF) network element can be configured to securely expose, to the outside, a service, a capability, and the like that are provided by a 3rd Generation Partnership Project (3GPP) network function.
11. A unified data management (UDM) network element is configured for unified data management, 5G user data management, user identifier processing, access authentication, registration, mobility management, or the like.
12. An application function (AF) network element is configured to route data affected by an application, access a network exposure function network element, interact with a policy framework to perform policy control, or the like.
13. Network data analytics function (NWDAF) network element: The NWDAF may have at least one of the following functions: data collection, model training, model feedback, analytics result inference, and analytics result feedback. The data collection function refers to collecting data from a network element, a third-party server, a terminal device, or a network management system. The model training function refers to performing analytics and training based on related input data to obtain a model. The model feedback function refers to sending a trained machine learning model to a network element that supports an inference function. The analytics result inference function determines a data analytics result based on the trained machine learning model and the inference data. The analytics result feedback function may provide a data analytics result for a network element, a third-party server, a terminal device, or a network management system. The data analytics result may assist a network in selecting a quality of service parameter of a service, assist a network in performing traffic routing, assist a network in selecting a background traffic transmission policy, or the like.

The typical application scenarios of the NWDAF include: terminal parameter customization or optimization, where the NWDAF collects information about user connection management, mobility management, session management, an accessed service, and the like, evaluates and analyzes users of different types by using a reliable analytics and prediction model, to construct user profiles, determines moving tracks and service usage habits of the users, and optimizes user mobility management parameters and radio resource management parameters; service (path) optimization, where the NWDAF collects information such as network performance, service load in an area, user service experience, and the like, evaluates and analyzes services of different types by using a reliable network performance analytics and prediction model, to construct service profiles, determines an internal association of quality of experience (QoE) of a service, service experience, a service path, a 5G quality of service (QOS) parameter, or the like, and optimizes the service path, service routing, 5G edge computing, 5G QoS corresponding to the service, and the like; and optimization of a service parameter by the AF. For example, the Internet of Vehicles is an important technology of a 5G network. In an automatic driving scenario of the Internet of Vehicles, network performance (such as QoS information and service load) of a base station that a vehicle is about to pass can be predicted to improve service quality of the Internet of Vehicles. For example, a server of the Internet of Vehicles may determine, based on predicted information of the network performance, whether to continue to maintain an unmanned driving mode. The NWDAF collects information about the network performance, the service load in the area, and the like, and collects statistics on and predicts the network performance by using a reliable network performance analytics and prediction model, helping the AF optimize the parameter.

In the embodiments, the NWDAF may be an independent network element, or may be integrated with another network element. For example, the NWDAF network element may be co-located with an AMF or co-located with an SMF.

In addition, the network architecture may further include: a network slice selection function (NSSF), configured to manage network slice-related information, and a service communication proxy (SCP), configured to support indirect communication, that is, support message forwarding and routing between a service invoking network element and a service providing network element, selection and discovery of the service providing network element, and the like. It should be understood that the foregoing enumerated network elements included in the communication system are merely examples for description and is not limited thereto.

In the foregoing network architecture, an N2 interface is an interface between a RAN and an AMF network element, and is configured to send a radio parameter, non-access stratum (NAS) signaling, and the like. An N3 interface is an interface between a RAN and a UPF network element and is configured to transmit user plane data and the like. An N4 interface is an interface between an SMF network element and a UPF network element and is configured to transmit information such as a service policy, tunnel identifier information of an N3 connection, data buffer indication information, and a downlink data notification message. An N6 interface is an interface between the DN network element and the UPF network element and is configured to transmit user plane data or the like.

It should be understood that, in the foregoing network architecture, information may be exchanged between network elements via a service-based interface. For example, the NWDAF network element may collect, from other network elements (such as the Namf and the Nsmf) via service-based interfaces (such as the AMF and the SMF) provided by these network elements, data generated by the terminal on the network elements, and provide data analytics results and models, which are also referred to as machine learning models, data, and the like, for other network elements (such as the AMF and PCF) via the Nnwdaf interface.

It should be understood that the foregoing network architecture applied to the embodiments is merely an example of a network architecture described from a perspective of a conventional point-to-point architecture and a servitization architecture, and a network architecture applicable to the embodiments is not limited thereto. Any network architecture that can implement functions of the foregoing network elements is applicable to the embodiments.

It should be noted that names of the network elements and interfaces in the embodiments are merely examples and do not exclude a case in which the network elements have other names and functions of the network elements are combined. With evolution of technologies, any device or network element that can implement functions of the foregoing network elements falls within the scope of the embodiments. In addition, the foregoing network element may also be referred to as an entity, a device, an apparatus, a module, or the like. This is not limited. In addition, for case of understanding and description, the description of the network element is omitted in some descriptions. For example, the NWDAF network element is referred to as an NWDAF for short. In this case, the "NWDAF" should be understood as the NWDAF network element. Same or similar cases are not described below.

In the network architecture shown in FIG. 1, the NWDAF network element may register network element information (NWDAF Profile) of the NWDAF network element with the NRF, where the NWDAF profile may include analytics type information, and the analytics type information may be identified by an analytics identifier (Analytics ID). Table 1 shows an example of related content of analytics ID:

TABLE 1

| Analytics information (Analytics Information) | Description (Description) |
|---|---|
| Slice load level information (Slice Load level information) | Analytics identifier: load level information (Analytics ID: load level information) |
| Observed service experience information (Observed Service experience information) | Analytics identifier: service experience (Analytics ID: Service Experience) |
| Network element load information (NF Load information) | Analytics identifier: network element load information (Analytics ID: NF load information) |
| Network performance information (Network Performance information) | Analytics identifier: network performance (Analytics ID: Network Performance) |
| Terminal mobility information (UE mobility information) | Analytics identifier: terminal mobility (Analytics ID: UE Mobility) |
| Terminal communication information (UE Communication information) | Analytics identifier: terminal communication (Analytics ID: UE Communication) |
| Terminal behavioral parameters expected by a network side (Expected UE behavioral parameters) | Analytics identifier: terminal mobility and/or terminal communication (Analytics ID: UE Mobility and/or UE Communication) |
| Abnormal terminal behavior information (UE Abnormal behavior information) | Analytics identifier: abnormal behavior (Analytics ID: Abnormal behavior) |
| User data congestion information (User Data Congestion information) | Analytics identifier: user data congestion (Analytics ID: User Data Congestion) |
| QoS sustainability (QoS Sustainability) | Analytics identifier: QoS sustainability (Analytics ID: QoS Sustainability) |

If the information of the NWDAF includes any one or more analytics identifiers in Table 1, it indicates that the NWDAF supports an analytics type corresponding to the one or more analytics identifiers. For example, analytics ID=service experience indicates that the NWDAF can provide data analytics results of the service experience type.

The data analytics result corresponding to the foregoing analytics type may be obtained by collecting the data of the UE by the NWDAF. In 3GPP Rel-17 23.288, how the NWDAF collects data from the UE is defined. Because a direct interface between the NWDAF and the UE is not defined in a current protocol, the NWDAF may collect data from an application of the UE via an AF, to train a machine learning model and generate a data analytics result. The AF may belong to an operator network or a third party. The conventional technology defines a procedure in which the NWDAF collects data from the UE but does not provide a method in which the UE obtains a data analytics result from the NWDAF.

In view of this, the embodiments provide a communication method, so that a terminal device can obtain a data analytics result from a data analytics network element based on an analytics type that is allowed to be requested by the terminal device. After obtaining the data analytics result, the terminal device may make a faster response based on the data analytics result, to assist in improving performance of the terminal device.

Figure 2:
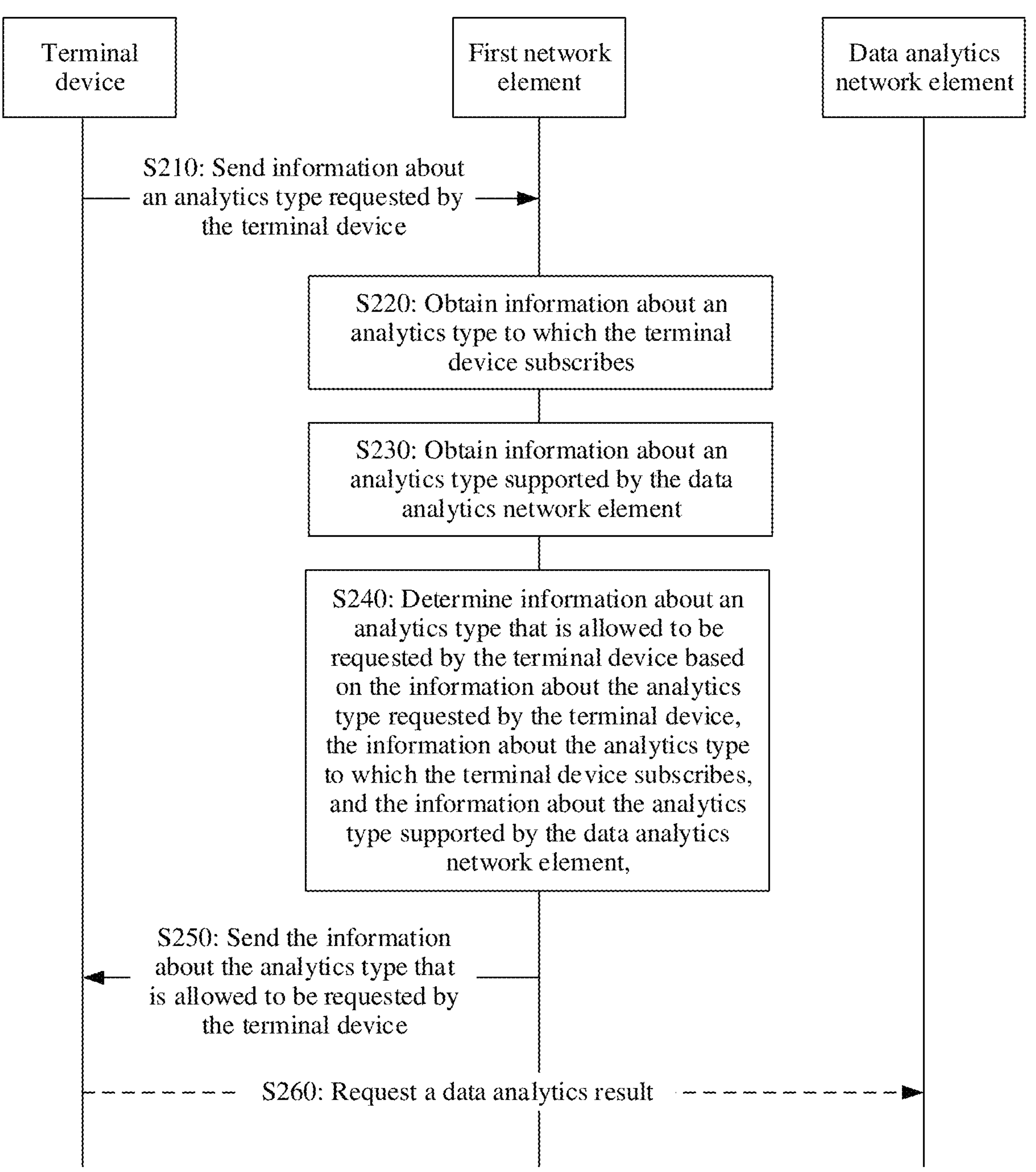
FIG. 2 is a schematic flowchart of a communication method according to an embodiment.

Without loss of generality, the following uses interaction between network elements as an example to describe in detail the communication method provided in the embodiments. FIG. 2 is a schematic flowchart of a communication method that includes at least the following several steps.

S210: A first network element obtains information about an analytics type (Requested Analytics ID) requested by a terminal device.

The information about the analytics type requested by the terminal device may also be referred to as information about an analytics type (Configured Analytics ID) configured by the terminal device. The analytics type requested by the terminal device may be replaced by the configured analytics type, and details are not described again.

The first network element may obtain, by receiving first information from the terminal device, the information about the analytics type requested by the terminal device. The first information may include identification information of the terminal device, for example, a subscription permanent identifier (SUPI), a permanent equipment identifier (PEI), or a generic public subscription identifier (GPSI) of the terminal device. The first information may further include a first analytics identifier, and the first analytics identifier is used to identify the information about the analytics type requested by the terminal device. For example, the first information may further include analytics result filtering information. For example, the first information includes information about an area of interest (AOI) of the terminal device. In other words, the terminal device requests a data analytics result in the AOI. The information about the AOI may include one or more of the following: a tracking area identifier (TAI), a cell identifier (cell ID), a geographical area identifier, a network code (NC), a country code (CC), a city code, and a county code.

The first network element may be a core network element or an application function network element. In a possible implementation, the first network element is an access and mobility management function network element, and that a first network element obtains an analytics type requested by a terminal device includes: The access and mobility management function network element receives a registration request (registration request) message from the terminal device, where the registration request message carries the first information.

In another possible implementation, the first network element is a session management network element, and that a first network element obtains information about an analytics type requested by a terminal device includes: The session management network element receives a session establishment request (session establishment request) message or a session modification request (session modification request) message from the terminal device, where the session establishment request message or the session modification request message carries the first information. For example, the session establishment request message or the session modification request message is a protocol data unit (PDU) session establishment request message or a PDU session modification request message. For example, the session management network element may alternatively receive, via a user plane function network element, the first information from the terminal device, where the first information is obtained by parsing a user plane uplink data packet by the user plane function network element. Alternatively, the session management network element may receive, via a user plane function network element, a user plane uplink data packet from the terminal device, where the user plane uplink data packet includes the first information. Further, the session management network element parses the user plane uplink data packet, to obtain the first information included in the user plane uplink data packet.

For example, if the session management network element parses the first information from the user plane uplink data packet from the user plane function network element, the method 200 may further include S201: The session management network element receives indication information from the terminal device, where the indication information indicates that the terminal device sends the first information via a user plane, or the indication information indicates that the terminal device carries the first information in a user plane uplink data packet. The session management network element sends, to the user plane function network element based on the indication information, a packet detection rule (PDR) corresponding to the first information. The PDR is used to assist the user plane function network element in sending, to the session management network element, the user plane uplink data packet that includes the first information. In other words, the PDR corresponds to the user plane uplink data packet that includes the first information. Correspondingly, after receiving the user plane uplink data packet that includes the first information, the user plane function network element sends the user plane uplink data packet to the session management network element based on the PDR corresponding to the first information.

A form of the indication information is not limited in the embodiments. For example, the indication information may explicitly indicate that the terminal device sends the first information via the user plane. For example, the indication information is information about a bit. When the bit is “0”, the indication information indicates that the terminal device sends the first information via the user plane. When the bit is “1”, the indication information indicates that the terminal device sends the first information via the user plane. The indication information may be named as an analytic subscription indication. For another example, the indication information may implicitly indicate that the terminal device sends the first information via the user plane. For example, the indication information is a preset data network name (DNN) and/or single network slice selection assistance information (S-NSSAI). If the PDU session establishment/modification request message from the terminal device to the session management network element includes the preset DNN and/or the S-NSSAI, the session management network element determines that the terminal device sends the first information via the user plane.

In still another possible implementation, the first network element is a user plane function network element, and that a first network element obtains information about an analytics type requested by a terminal device includes: The user plane function network element receives a user plane uplink data packet from the terminal device, where the user plane uplink data packet includes first information. Further, the user plane function network element parses the user plane uplink data packet, to obtain the first information.

In still another possible implementation, the first network element may alternatively be an application function network element, and that a first network element obtains information about an analytics type requested by a terminal device includes: The application function network element receives an application layer uplink data packet from the terminal device, where the application layer uplink data packet includes first information.

S220: The first network element obtains information about an analytics type (Subscribed Analytics ID) to which the terminal device subscribes.

The first network element may request subscription data of the terminal device from a unified data management network element or an application function network element. For example, the first network element may send a second request message to the unified data management network element or the application function network element, where the second request message is used to request the information about the analytics type to which the terminal device subscribes, and the second request message may carry identification information of the terminal device.

In a possible implementation, the first network element may be an access and mobility management function network element, a session management network element, or a user plane function network element, and the second request message may be a subscription request message. For example, the first network element subscribes to and obtains, from the unified data management UDM network element via a subscription data subscription (Nudm_SDM_Subscribe) service operation, information about a subscribed analytics type corresponding to the identification information (such as the SUPI, the PEI, or the GPSI) of the terminal device. Correspondingly, the UDM feeds back, to the first network element via a subscription data notification (Nudm_SDM_Notification) service operation, the information about the analytics type to which the terminal device subscribes. Alternatively, the first network element may directly obtain, from an application function network element, the information about the analytics type to which the terminal device subscribes. For example, the first network element subscribes to, from the application function network element via an event exposure subscription (Naf_EventExposure_Subscribe) service operation, the information about the analytics type to which the terminal device subscribes. Correspondingly, the application function network element feeds back, to the first network element via an event exposure notification (Naf_EventExposure_Notify) service operation, the information about the analytics type to which the terminal device subscribes.

The information about the analytics type to which the terminal device subscribes may be preconfigured on the UDM. Alternatively, the application function network element may register, with the UDM via an Nudm_Parameter-Provision service operation provided by a parameter of the UDM network element, the information about the analytics type to which the terminal device subscribes.

If the first network element is a session management network element, the first request message may further include identification information of an application of the terminal device, and the information that is obtained by the first network element and that is about the analytics type to which the terminal device subscribes corresponds to the identification information. In other words, the analytics type to which the terminal device subscribes and that is obtained by the first network element may be at a terminal device granularity or may be at a service granularity.

It should be noted that, if the analytics type to which the terminal device subscribes on the UDM changes (for example, a user package changes), the UDM may send information about an updated analytics type (Updated Subscribed Analytics ID) to the first network element via the subscription data notification service. Similarly, if the analytics type to which the terminal device subscribes on the application function network element changes, the user function network element may also send information about an updated analytics type to the first network element.

In another possible implementation, the first network element is an application function network element, and that the first network element obtains information about an analytics type to which the terminal device subscribes includes: The application function network element receives the first information from the terminal device, where the first information includes IP address information of the terminal device; and the application function network element obtains the identification information of the terminal device based on the IP address information of the terminal device, for example, the SUPI or the GPSI of the terminal device, and determines, based on the identification information of the terminal device, the information about the analytics type to which the terminal device subscribes. Alternatively, the service type service to which the terminal device subscribes and that is determined by the application function network element may be at a service granularity. For example, the application function network element determines an analytics type corresponding to the identification information of the application of the terminal device.

In another possible implementation, the first network element is a network repository function network element, and that the first network element obtains information about an analytics type to which the terminal device subscribes includes: The network repository function network element receives a first request message from an access and mobility management function network element, a session management network element, a user plane function network element, or an application function network element, where the first request message includes the information about the analytics type requested by the terminal device and the information about the analytics type to which the terminal device subscribes. In other words, when the first network element is a network repository function network element, the first network element may obtain both the information about the analytics type requested by the terminal device and the information about the analytics type to which the terminal device subscribes.

S230: The first network element obtains information about an analytics type supported by a data analytics network element.

In a possible implementation, the first network element is an access and mobility management function network element, a session management network element, a user plane function network element, or an application function network element. The first network element may obtain, via a network repository function network element, the information about the analytics type supported by the data analytics network element. The data analytics network element may be an NWDAF or may be another network element having a data analytics function.

The first network element may send a first request message to the network repository function network element, where the first request message is used to request information about the data analytics network element. The first request message may carry at least one of the following information: information about an AOI of the terminal device, and information about a location area in which the terminal device is located, for example, a cell or a tracking area on which the terminal device is currently camped and that is sensed by the first network element. The network repository function network element discovers a data analytics network element that serves the AOI of the terminal device or the location area in which the terminal device is located, and information about the analytics type supported by the data analytics network element. The network repository function network element sends the information about the data analytics network element to the first network element by using a response message, where the information about the data analytics network element includes the information about the analytics type supported by the data analytics network element.

The information about the data analytics network element may further carry the following information: identification information of the data analytics network element and/or address information of the data analytics network element. The address information of the data analytics network element may include information such as an IP address, a fully qualified domain name (fully qualified domain name, FQDN), and a uniform resource locator (uniform resource locator, URL) of the data analytics network element.

For example, the first network element may request, from the network repository function network element via a network function discovery request (Nnrf_NFDiscovery_Request) service operation, information about an available data analytics network element and information about an analytics type supported by the data analytics network element. Correspondingly, the network repository function network element sends the information about the data analytics network element to the first network element via a network function discovery request response (Nnrf_NFDiscovery_Request Response) service operation, where the information about the data analytics network element includes the information about the analytics type supported by the data analytics network element.

For example, the first network element may further request, from the data analytics network element based on the address information that is of the data analytics network element and that is from the network repository function, the information about the analytics type supported by the data analytics network element. Optionally, in this implementation, the first network element may determine that the information that is about the data analytics network element and that is received from the network repository function network element does not include the information about the analytics type supported by the data analytics network element, and request, from the data analytics network element, the information about the analytics type supported by the data analytics network element.

For example, the first network element may send a subscription request message to the data analytics network element via an available analytics s type subscription Nnwdaf_AvailableAnalytics_Subscribe service operation of the NWDAF network element, to request the information about the analytics type supported by the data analytics network element. The data analytics network element sends the information about the analytics type supported by the data analytics network element to the first network element via an available analytics notification Nnwdaf_AvailableAnalytics_Notify service operation of the NWDAF network element.

It should be noted that, if the first network element receives first information of a plurality of terminal devices, and the first information of the plurality of terminal devices includes information about a plurality of AOIs, the first network element may further form a list by using the information about the AOIs of the plurality of terminal devices, information about a requested analytics type corresponding to each AOI, and information about a subscribed analytics type corresponding to each AOI. For example, the list may be represented as a list of <AOI, list of Requested Analytics ID, list of (Updated) Subscribed Analytics ID>. Then, based on the list, a data analytics network element that meets a requirement is requested from the network repository function network element.

Similarly, the network repository function network element may discover one or more data analytics network elements that meet the requirement, and the network repository function network element may return a list of data analytics network elements that meet the requirement. The list of data analytics network elements that meet the requirement may include identification information and/or address information of the one or more data analytics network elements, and information about analytics types supported by the data analytics network elements. The first network element may select a data analytics network element from the one or more data analytics network elements. Alternatively, the network repository function network element may select a data analytics network from the one or more data analytics network elements and send information about the data analytics network element to the first network element. This is not limited.

The first network element may further obtain information about an updated analytics type supported by the data analytics network element. For example, the first network element sends a subscription request message to the network repository function network element via a network function network element status subscription request (Nnrf_NFManagement_NFStatusSubscribe) service operation in network function management, where the subscription request message is used to request to send a corresponding notification message to the first network element when the information about the analytics type supported by the data analytics network element changes (for example, the NWDAF may provide a new analytics type to the terminal device, or the NWDAF may no longer provide an analytics type to the terminal device). The subscription request message may carry the identification information and/or the address information of the data analytics network element, and analytics update indication (analytics update indication) information, where the analytics update indication information indicates the network repository function network element to send a notification to the first network element when the information about the analytics type supported by the corresponding data analytics network element changes.

Correspondingly, when the analytics type supported by the data analytics network element changes, the network repository function network element sends updated information to the first network element via a network function network element status notification (Nnrf_NFManagement_NFStatusNotify) service operation. The notification message from the network repository function network element may carry the identification information and/or the address information of the data analytics network element, and information about an updated analytics type supported by the data analytics network element.

For example, the first network element may further directly subscribe to an analytics type update notification from the data analytics network element. For example, the first network element may send a subscription request message to the data analytics network element via the Nnwdaf_AvailableAnalytics_Subscribe service operation, where the subscription request message is used to request to send a notification to the first network element when the information about the analytics type provided by the data analytics network element changes. Correspondingly, the data analytics network element sends the information about the updated analytics type supported by the data analytics network element to the first network element via the available analytics type notification Nnwdaf_AvailableAnalytics_Notify service operation of the NWDAF network element.

In another possible implementation, the first network element is a network repository function network element, and that the first network element obtains information about an analytics type supported by a data analytics network element includes: The first network element receives a first request message from an access and mobility management function network element, a session management network element, a user plane function network element, or an application function network element, where the first request message is used to request information about the data analytics network element. The first request message may carry at least one of the following information: information about an AOI of the terminal device, information about a location area in which the terminal device is located, the information about the analytics type requested by the terminal device, and the information about the analytics type to which the terminal device subscribes. The network repository function network element discovers a data analytics network element that serves the AOI and/or the location area in which the terminal device is located, and information about the analytics type supported by the data analytics network element.

S240: The first network element determines information about an analytics type that is allowed to be requested by the terminal device (allowed Analytics ID) based on the information about the analytics type requested by the terminal device, the information about the analytics type to which the terminal device subscribes, and the information about the analytics type supported by the data analytics network element.

In a possible implementation, the first network element obtains an intersection of the information about the analytics type requested by the terminal device, the information about the analytics type to which the terminal device subscribes, and the information about the analytics type supported by the data analytics network element and determines the information about the analytics type that is allowed to be requested by the terminal device.

In another possible implementation, the first network element may further obtain an intersection of any two of the information about the analytics type requested by the terminal device, the information about the analytics type to which the terminal device subscribes, and the information about the analytics type supported by the data analytics network element, and determines the information about the analytics type that is allowed to be requested by the terminal device.

If the first network element obtains an intersection of any two of the information about the analytics type requested by the terminal device, the information about the analytics type to which the terminal device subscribes, and the information about the analytics type supported by the data analytics network element, and determines the information about the analytics type that is allowed to be requested by the terminal device, the first network element may also skip a step of obtaining information of a remaining analytics type. For example, if the first network element determines, based on the information about the analytics type requested by the terminal device and the information about the analytics type to which the terminal device subscribes, the information about the analytics type that is allowed to be requested by the terminal device, the first network element may not perform step S230.

In a possible implementation, the first network element is an access and mobility management function network element, a session management network element, a user plane function network element, or an application function network element, and the first network element determines the analytics type requested by the terminal device, and determines an intersection of the (updated) analytics type to which the terminal device subscribes and the (updated) analytics type supported by the data network element as the analytics type that is allowed to be requested by the terminal device.

In another possible implementation, the first network element is a network repository function network element, and the network repository function network element determines, based on the information that is about the analytics type requested by the terminal device and that is obtained from an access and mobility management function network element, a session management network element, a user plane function network element, or an application function network, information about an (updated) analytics type to which the terminal device subscribes, and information that is about an (updated) analytics type supported by the data analytics network element and that is determined by the network repository function network element, the information about the analytics type that is allowed to be requested by the terminal device.

S250: The first network element sends, to the terminal device, the information about the analytics type that is allowed to be requested by the terminal device.

In a possible implementation, the first network element is an access and mobility management function network element, and the first network element sends, to the terminal device via a path from the access and mobility management function network element to the access network device to the terminal device, the information about the analytics type that is allowed to be requested by the terminal device. In other words, the access and mobility management function network element sends the data analytics result to the access network device, and the access network device sends the data analytics result to the terminal device. For example, the access and mobility management function network element sends a registration accept (registration accept) message to the terminal device, where the registration accept message includes the information about the analytics type that is allowed to be requested by the terminal device.

In another possible implementation, the first network element is a session management network element, and the first network element sends, to the terminal device by using a session modification command message, the information about the analytics type that is allowed to be requested by the terminal device. For example, the session management network element sends an N1 session management (SM) container to the access and mobility management function network element by invoking an AMF service-based interface_communication_N1N2 message transfer (Namf_Communication_N1N2MessageTransfer) operation service, where the N1 SM container includes a PDU session modification command, and the PDU session modification command includes the information about the analytics type that is allowed to be requested by the terminal device. Then, the access and mobility management function network element transparently transmits the N1 SM container to the terminal device. For example, the session management network element may further send a user plane downlink data packet to the terminal device via a user plane function network element, where the user plane downlink data packet includes the information about the analytics type that is allowed to be requested by the terminal device.

In still another possible implementation, the first network element is a user plane network element, and the user plane network element sends, to the terminal device by using a user plane downlink data packet, the information about the analytics type that is allowed to be requested by the terminal device.

In still another possible implementation, the first network element is an application function network element, and the application function network element sends, to the terminal device by using an application layer downlink data packet, the information about the analytics type that is allowed to be requested by the terminal device.

In still another possible implementation, the first network element is a network repository function network element, and the network repository function network element may send, to an access and mobility management function network element, a session management function network element, a user plane function network element, or an application function network element, the determined information about the analytics type that is allowed to be requested by the terminal device. Then, the determined information about the analytics type that is allowed to be requested by the terminal device is sent to the terminal device by the access and mobility management function network element, the session management function network element, the user plane function network element, or the application function network element.

According to the method provided in this embodiment, the first network element may determine, based on the information about the analytics type requested by the terminal device, the information about the analytics type to which the terminal device subscribes, and the information about the analytics type supported by the data analytics network element, the information about the analytics type that is allowed to be obtained by the terminal device. In addition, the first network element sends, to the terminal device, the information about the analytics type that is allowed to be obtained by the terminal device, so that the terminal device can obtain the data analytics result from the data analytics network element, and performance of the terminal device can be improved.

Figure 3:
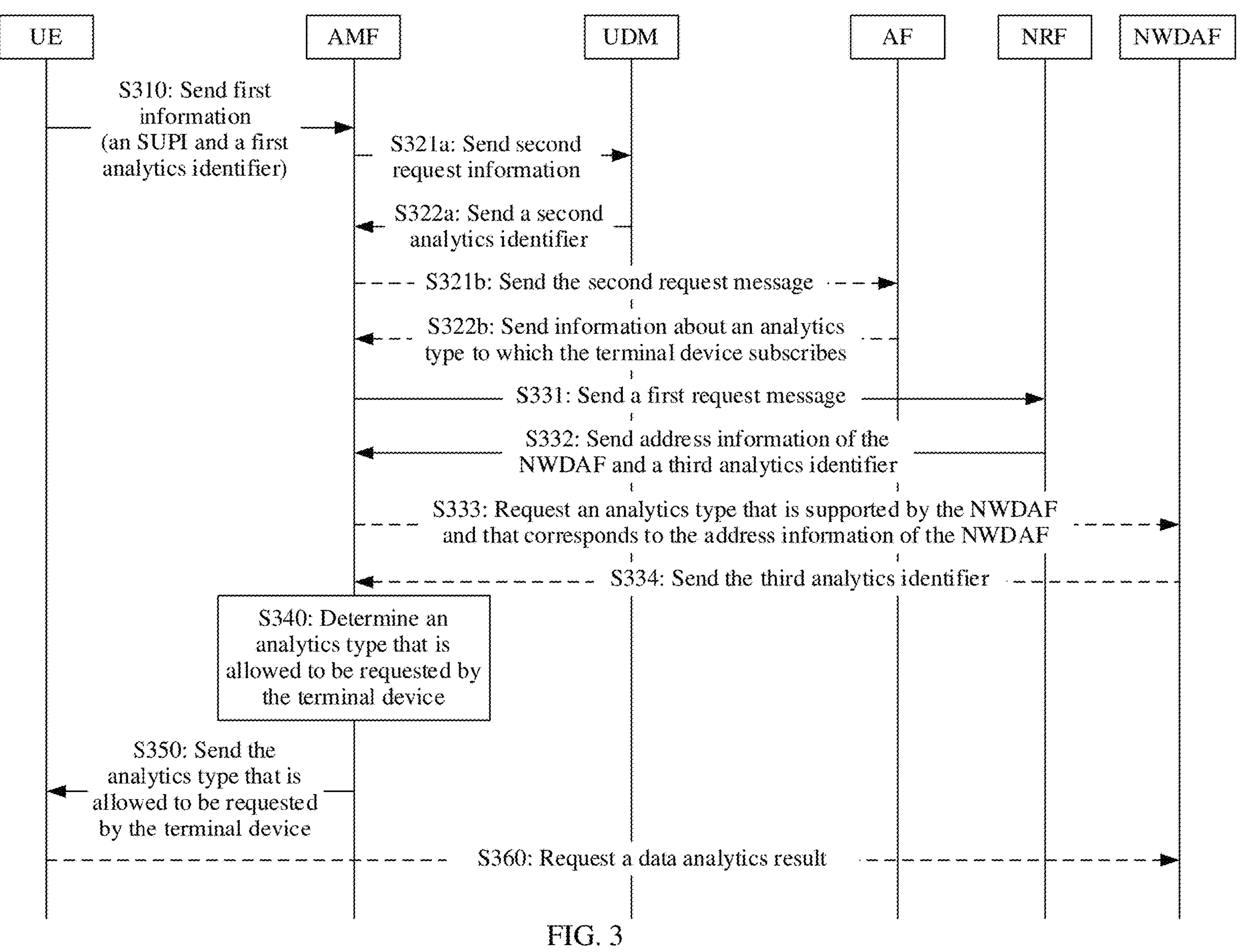
FIG. 3 is a schematic flowchart of a communication method according to an embodiment.

Different implementations of the method 200 are described in detail below with reference to FIG. 3 to FIG. 9A and FIG. 9B. In FIG. 3, an example in which the first network element is an access and mobility management function network element (denoted as an AMF in the following) is used to describe the communication method provided in embodiments. As shown in FIG. 3, the method includes at least the following steps.

S310: A UE sends first information to the AMF.

The first information includes identification information of a terminal device and a first analytics identifier, and the first analytics identifier is used to identify information about an analytics type (Requested or Configured Analytics ID) requested by the terminal device. For the identification information of the terminal device, refer to the description in S210. For example, the first information may further include analytics result filtering information. For example, the first information includes information about an AOI of the terminal device.

For example, the terminal device may send a registration request to the AMF, and the registration request includes the first information. The registration request initiated by the terminal device to the AMF may be an initial registration request or may be a mobility registration update request, or a periodic registration update request. If the UE is in an idle state and wants to subscribe to a new data analytics result, the terminal device may initiate the initial registration request to the AMF. If the UE is in a connected state and wants to subscribe to a new data analytics result, the UE may initiate the latter two registration requests.

S320: The AMF obtains information about an analytics type (Subscribed Analytics ID) to which the terminal device subscribes.

In a possible implementation, in S321*a*, the AMF subscribes to, from a UDM network element via a subscription data subscription (Nudm_SDM_Subscribe) service operation (an example of a second request message) and obtains the analytics type to which the terminal device subscribes. Correspondingly, in S322*a*, the UDM sends a second analytics identifier to the AMF via a subscription data notification (Nudm_SDM_Notification) service operation, where the second analytics identifier is used to identify the information about the analytics type to which the terminal device subscribes.

The analytics type to which the terminal device subscribes may be preconfigured on the UDM. Alternatively, an application function AF may register, with the UDM via an Nudm_ParameterProvision service operation, the analytics type to which the terminal device subscribes.

It should be noted that if the analytics type to which the terminal device subscribes on the UDM changes (for example, a user package changes), the UDM may send, to the AMF by using the subscription data notification service, information about an updated analytics type to which the terminal device subscribes.

In another possible implementation, the AMF may further directly obtain, from the AF, the subscribed analytics type corresponding to the identification information of the terminal device.

For example, in S321*b*, the AMF subscribes to, from the AF via an event exposure subscription (Naf_EventExposure_Subscribe) service operation (an example of the second request message), the information about the subscribed analytics type corresponding to the terminal device.

Correspondingly, in S322*b*, the AF sends a second analytics identifier to the AMF via an event exposure notification (Naf_EventExposure_Notify) service operation, where the second analytics identifier is used to identify the information about the subscribed analytics type corresponding to the terminal device.

Similarly, if the analytics type to which the terminal device subscribes on the AF changes (for example, a user package changes), the AF may send an updated analytics type to the AMF via an Naf_EventExposure_Notify service operation.

S330: The AMF obtains information about an analytics type supported by an NWDAF.

In a possible implementation, the AMF may obtain information about the NWDAF via an NRF.

For example, in S331, the AMF may request information about an available NWDAF from the NRF network element via a network function discovery request (Nnrf_NFDiscovery_Request) service operation. The information about the NWDAF includes the information about the analytics type supported by the NWDAF.

The request message from the AMF may carry at least one of the following information: information about an AOI of the terminal device, and information about a location area in which the terminal device is located.

Correspondingly, in S332, the NRF discovers the NWDAF that serves the AOI or the location area in which the terminal device is located and the information about the analytics type supported by the NWDAF and sends a third analytics identifier to the AMF via a network function discovery request response (Nnrf_NFDiscovery_Request Response) service operation. The third analytics identifier is used to identify the information about the analytics type supported by the NWDAF.

The response message from the NRF may carry the following information: identification information of the NWDAF and/or address information of the NWDAF, and the information about the analytics type supported by the NWDAF.

For example, the AMF may further send a subscription request message to the NRF via a network function network element status subscription (Nnrf_NFManagement_NFStatusSubscribe) service operation, to request to send a corresponding notification message when the information about the analytics type supported by the NWDAF changes. The subscription request message may carry the identification information and/or the address information of the NWDAF and analytics update indication information. The analytics update indication information indicates the NRF to send a notification to the AMF when the information about the analytics type supported by the corresponding NWDAF changes.

Correspondingly, when the information about the analytics type supported by the NWDAF changes, the NRF may send an updated result to the AMF via a network function status notification (Nnrf_NFManagement_NFStatusNotify) service operation. The notification message from the NRF may carry the identification information and/or the address information of the NWDAF, and information about an updated analytics type supported by the NWDAF.

For example, in S333, the AMF may further subscribe to, from the NWDAF based on the address information that is of the NWDAF and that is from the NRF, the information about the analytics type supported by the NWDAF or the information about the updated analytics type supported by the NWDAF.

For example, the AMF may send a subscription request message to the NWDAF via an available analytics type subscription Nnwdaf_AvailableAnalytics_Subscribe service operation of the NWDAF network element, to request the information about the analytics type supported by the NWDAF, or request to send a corresponding notification when the information about the analytics type supported by the NWDAF changes. The subscription request message may carry the address information of the NWDAF. The subscription request message may further carry the analytics update indication information, where the analytics update indication information indicates the NWDAF to send a notification message to the AMF when the information about the analytics type supported by the NWDAF changes.

Correspondingly, when the information about the analytics type supported by the NWDAF changes, the NWDAF sends an updated result to the AMF via an Nnwdaf_AvailableAnalytics_Notify service operation.

S340: The AMF determines information about an analytics type that is allowed to be requested by the terminal device.

After obtaining the information about the analytics type to which the terminal device subscribes, the information about the analytics type supported by the NWDAF, and the information about the analytics type requested by the terminal device, the AMF may obtain an intersection of the three types of information or obtain an intersection of any two of the three types of information, and determine the information about the analytics type that is allowed to be obtained by the terminal device. This step is similar to S240. Alternatively, the AMF may update, based on the received information about the updated analytics type to which the terminal device subscribes, the information about the updated analytics type supported by the NWDAF, and the information about the updated analytics type requested by the terminal device, the information about the analytics type that is allowed to be requested by the terminal device.

S350: The AMF sends, to the terminal device, the information about the analytics type that is allowed to be requested by the terminal device. Correspondingly, the terminal device receives the information.

For example, the AMF may send a registration accept message to the terminal device, where the registration accept message carries the information about the analytics type that is allowed to be requested by the terminal device.

For example, in S360, the terminal device requests a data analytics result from the NWDAF based on the information about the analytics type that is allowed to be requested.

Figure 4:
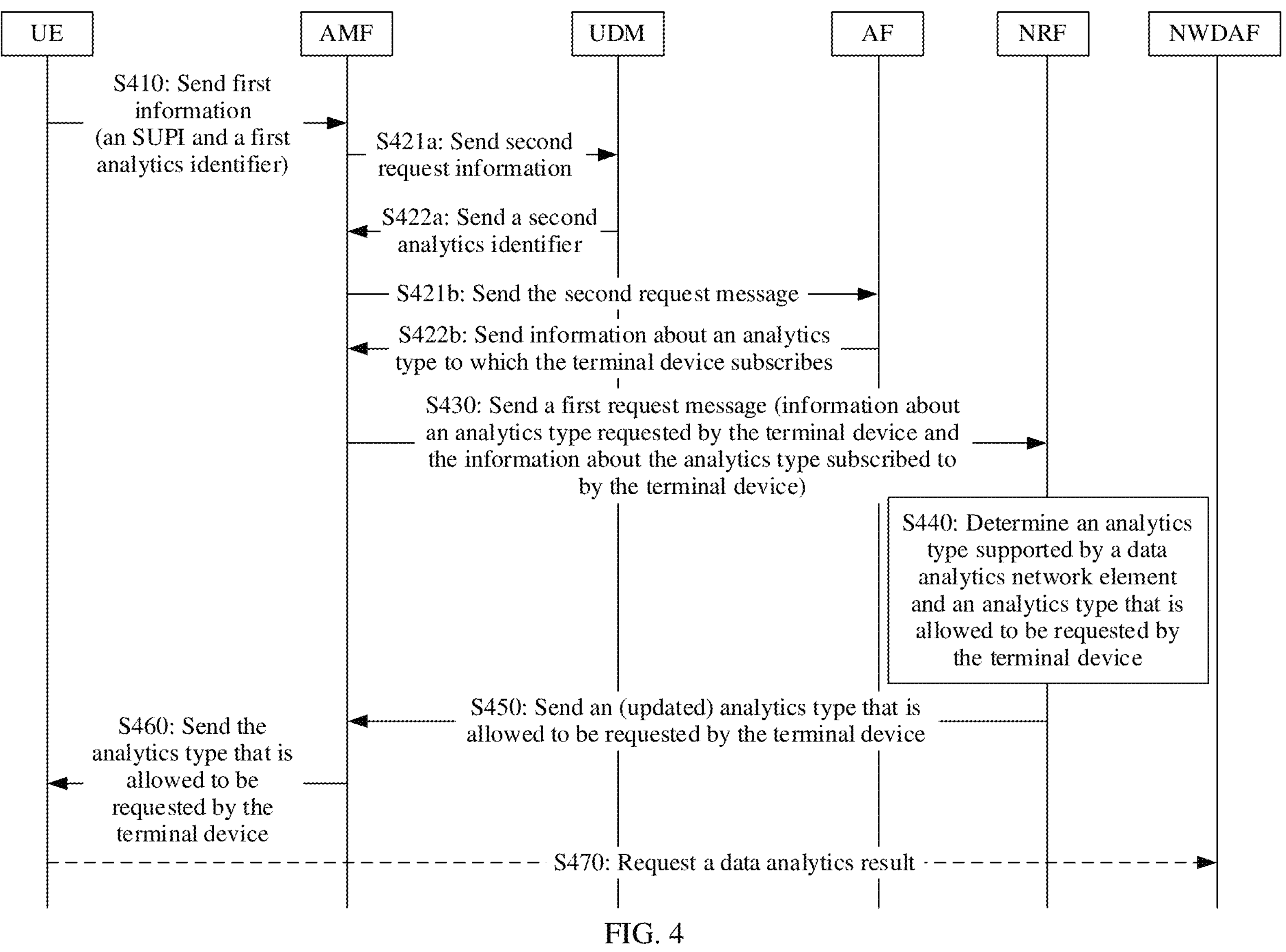
FIG. 4 is a schematic flowchart of a communication method according to another embodiment.

In FIG. 4, an example in which the first network element is a network repository function network element (denoted as an NRF in the following) is used to describe the communication method provided in embodiments. As shown in FIG. 4, the method includes at least the following steps.

S410: A UE sends first information to an AMF.

The first information includes information about an analytics type requested by a terminal device. This step is similar to S310, and details are not described herein again.

S420: The AMF obtains information about an analytics type to which the terminal device subscribes.

In a possible implementation, in S421*a*, the AMF may subscribe to and obtain, from an UDM, the information about the analytics type to which the terminal device subscribes. Correspondingly, in S422*a*, the UDM sends a second analytics identifier to the AMF, where the second analytics identifier is used to identify the information about the analytics type to which the terminal device subscribes. This step is similar to S321*a* and S322*a*.

For example, the AMF may further directly obtain, from an AF, the information about the analytics type to which the terminal device subscribes.

For example, in S421*b*, the AMF subscribes to, from the AF via an Naf_EventExposure_Subscribe service operation, the information about the analytics type to which the terminal device subscribes. Correspondingly, in S422*b*, the AF sends the second analytics identifier to the AMF via the Naf_EventExposure_Notify service operation. This step is similar to S321*b* and S322*b*.

If the information about the analytics type to which the terminal device subscribes changes, the UDM or the AF may send, to the AMF, information about an updated analytics type to which the terminal device subscribes. This step is similar to S320.

S430: The AMF sends a first request message to an NRF, where the first request message is used to request information about a data analytics network element, and the first request message carries the information about the analytics type requested by the terminal device and the information about the analytics type to which the terminal device subscribes.

The first request message may further carry at least one of the following information: information about an AOI of the terminal device, or information about a location area in which the terminal device is located.

For example, the AMF may request, from the NRF network element via a network function discovery request (Nnrf_NFDiscovery_Request) service operation, an available NWDAF and information about an analytics type supported by an NWDAF. The network function discovery request carries the information about the analytics type requested by the terminal device and the information about the analytics type to which the terminal device subscribes.

For example, the AMF may further send a subscription request message to the NRF via an Nnrf_NFManagement_NFStatusSubscribe service operation, to request to send information about an updated data analytics network element when the information about the analytics type supported by the NWDAF changes.

S440: The NRF discovers the NWDAF that serves the AOI or the location of the area in which the terminal device is located and the information about the analytics type supported by the NWDAF, and determines information about an analytics type that is allowed to be requested by the terminal device based on the information about the analytics type supported by the NWDAF, the information about the analytics type requested by the terminal device, and the information about the analytics type to which the terminal device subscribes.

For example, when the information about the analytics type supported by the NWDAF changes, the NRF may further obtain, based on the subscription request message, an intersection of the information about the updated analytics type supported by the NWDAF, the received information about the analytics type requested by the terminal device, and the information about the (updated) analytics type to which the terminal device subscribes, and re-determine the information about the analytics type that is allowed to be requested by the terminal device.

S450: The NRF sends, to the AMF, the information about the analytics type that is allowed to be requested by the terminal device.

For example, the NRF may send a notification message to the AMF via an Nnrf_NFDiscovery_Response service operation. The notification message carries identification information and/or address information of the NWDAF and the information about the analytics type that is allowed to be requested by the terminal device.

For example, the NRF may further send, to the AMF via an Nnrf_NFManagement_NFStatusNotify service operation, information about an updated analytics type that is allowed to be requested by the terminal device.

S460: The AMF sends, to the terminal device, the information about the analytics type that is allowed to be requested by the terminal device. Correspondingly, the terminal device receives the information.

For example, in S470, the terminal device requests a data analytics result from the NWDAF based on the information about the analytics type that is allowed to be requested.

According to the method provided in this embodiment, the AMF or the NRF may determine, based on the information about the analytics type requested by the terminal device, the information about the analytics type to which the terminal device subscribes, and the information about the analytics type supported by the NWDAF, the information about the analytics type (a first analytics type) that is allowed to be obtained by the terminal device. The AMF sends the information about the first analytics type to the terminal device, so that the terminal device can obtain a data analytics result from the data analytics network element, and performance of the terminal device can be improved.

Figure 5:
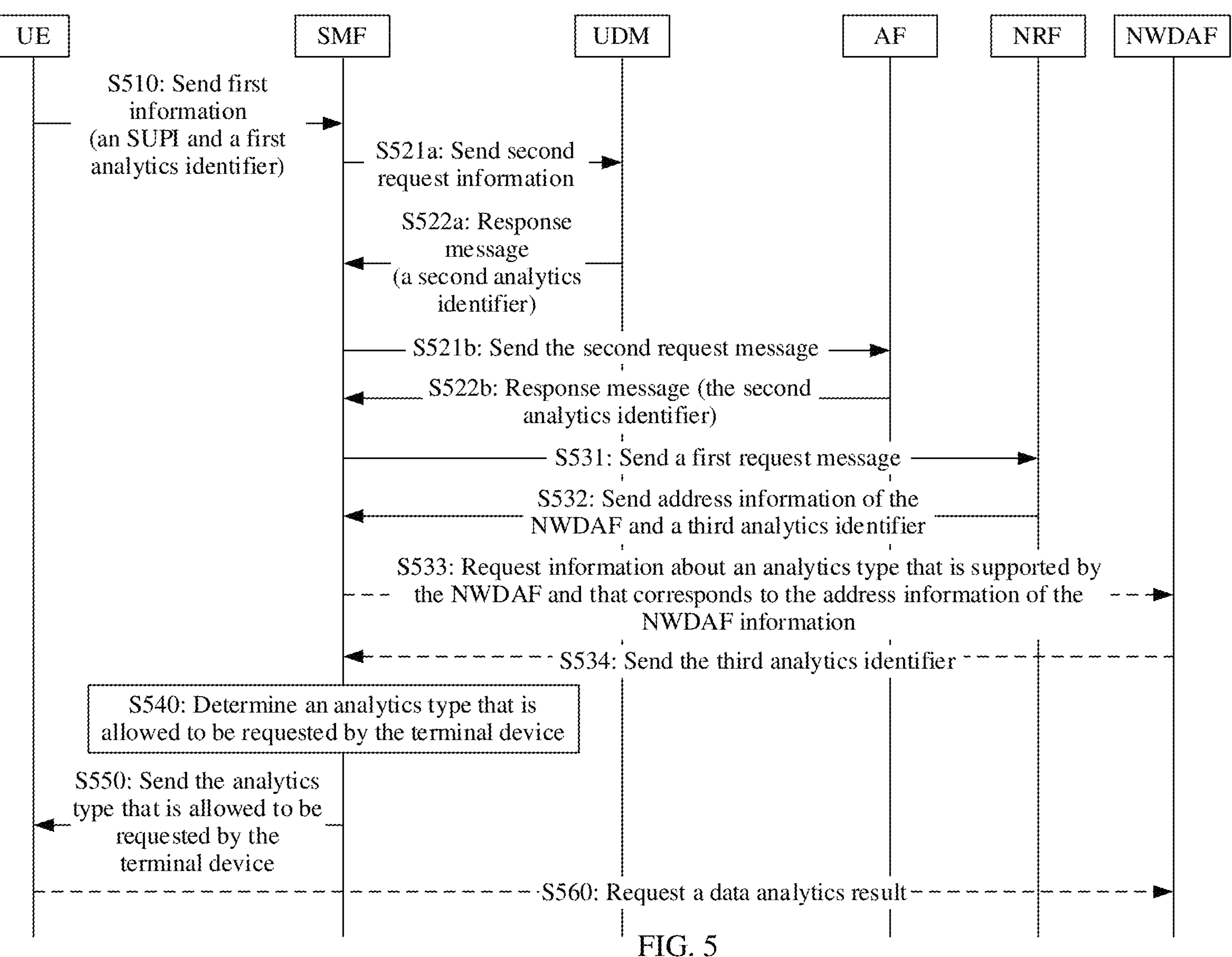
FIG. 5 is a schematic flowchart of a communication method according to another embodiment.

In FIG. 5, an example in which a first network element is a session management network element (denoted as an SMF in the following) is used to describe a communication method provided in embodiments. As shown in FIG. 5, the method includes at least the following steps.

S510: A UE sends first information to the SMF.

The first information includes identification information of a terminal device and a first analytics identifier, and the first analytics identifier is used to identify information about a type of an analytics result requested by the terminal device.

For example, the first information may further include analytics result filtering information. The analytics result filtering information is similar to that in S310, and details are not described herein again.

For example, the UE sends a PDU session establishment request message to the SMF, where the PDU session establishment request message includes the first information.

S520: The SMF obtains a second analytics identifier, where the second analytics identifier is used to identify information about an analytics type to which the UE subscribes.

In a possible implementation, in S521*a*, the SMF subscribes to and obtains the second analytics identifier from an UDM network element via a subscription data subscription Nudm_SDM_Subscribe Request service operation (an example of a second request message).

The second request message may include the identification information of the terminal device. For example, the subscription request message may further include identification information (App ID) of an application of the terminal device, and the App ID is used to identify a second analytics identifier corresponding to a service requested by the SMF. That is, the information that is about the analytics type to which the terminal device subscribes and that is requested by the SMF from the UDM may be at a service granularity.

Correspondingly, in S522*a*, the UDM feeds back the second analytics identifier to the SMF via a subscription data notification Nudm_SDM_Notification service operation. In addition, if the information about the analytics type to which the terminal device subscribes on the UDM changes (for example, a user package changes), the UDM may further send, to the SMF via the subscription data notification Nudm_SDM_Notification service operation, information about an updated analytics type to which the terminal device subscribes.

The analytics type to which the terminal device subscribes may be preconfigured on the UDM. Alternatively, an application function (AF) may register, with the UDM via an Nudm_ParameterProvision service operation, the analytics type to which the terminal device subscribes.

In another possible implementation, the SMF may further directly obtain the second analytics identifier from the AF.

For example, in S521*b*, the SMF subscribes to, from the AF via an Naf_EventExposure_Subscribe service operation, the information about the analytics type to which the terminal device subscribes, where the subscription request message may include the identification information of the terminal device. For example, the subscription request message may further include an App ID.

Correspondingly, in S522*b*, the AF feeds back, to the AMF via an Naf_EventExposure_Notify service operation, the information about the analytics type to which the terminal device subscribes. If the information, configured on the AF, about the analytics type to which the terminal device subscribes is at a terminal device granularity, the AF determines, based on the identification information of the terminal device, the information about the analytics type to which the terminal device subscribes. Alternatively, if the analytics type to which the terminal device subscribes and that is configured on the AF is at a service granularity, the AF determines, based on the App ID, the information about the analytics type to which the terminal device subscribes. Similarly, if the information about the analytics type to which the terminal device subscribes on the AF changes, the AF may send, to the AMF via an Naf_EventExposure_Notify service operation, information about an updated analytics type to which the terminal device subscribes.

S531: The SMF obtains a third analytics identifier via an NRF, where the third analytics identifier is used to identify information about an analytics type supported by an NWDAF.

For example, the SMF may request (an example of the first request message) information about an available NWDAF from the NRF network element via a network function discovery Nnrf_NFDiscovery_Request service operation. The request message from the SMF may carry at least one of the following information: information about an AOI of the terminal device, and information about a location area in which the terminal device is located.

Correspondingly, in S532, the NRF discovers the NWDAF that serves the AOI or the location of the area in which the terminal device is located, and the information about the analytics type supported by the NWDAF, and sends the information about the NWDAF to the SMF via an Nnrf_NFDiscovery_Response service operation, where the information about the NWDAF includes the information about analytics types supported by the NWDAF. The information about the NWDAF may further carry identification information and/or address information of the NWDAF.

For example, the SMF may further send a subscription request message to the NRF via an Nnrf_NFManagement_NFStatusSubscribe service operation, to request to send a corresponding notification message when the information about the analytics type supported by the NWDAF changes. Correspondingly, when the information about the analytics type supported by the NWDAF changes, the NRF sends an updated result to the SMF via an Nnrf_NFManagement_NFStatusNotify service operation. The notification message from the NRF may carry the information about the NWDAF, and the information about the NWDAF includes information about an updated analytics type supported by the NWDAF. The information about the NWDAF may further include the identification information and/or the address information of the NWDAF.

For example, in S533, the SMF may further directly request an (updated) analytics type supported by the NWDAF from the NWDAF.

For example, the SMF may send a subscription request message to the NWDAF via an Nnwdaf_AvailableAnalytics_Subscribe service operation, to request the information about the analytics type supported by the NWDAF, or request to send a corresponding notification when the information about the analytics type supported by the SMF changes. The subscription request message may carry the identification information and/or the address information of the NWDAF. For example, the subscription request message may further carry analytics update indication information, where the analytics update indication information indicates the NWDAF to send a notification message to the SMF when the analytics type supported by the NWDAF changes.

Correspondingly, in S534, the NWDAF sends the information about the analytics type supported by the NWDAF to the SMF via an Nnwdaf_AvailableAnalytics_Notify service operation.

S540: The SMF determines information about an analytics type (Allowed Analytics ID) that is allowed to be requested by the terminal device.

This step is similar to S240. Alternatively, the SMF may update, based on the information about the updated analytics type to which the terminal device subscribes, the information about the analytics type supported by the NWDAF, and the information about the analytics type requested by the terminal device, the information about the analytics type that is allowed to be requested by the terminal device.

S550: The SMF sends, to the terminal device, the information about the analytics type that is allowed to be requested by the terminal device. Correspondingly, the terminal device receives the information.

For example, the SMF may send a PDU session establishment accept message to the terminal device, where the PDU session establishment accept message carries the information about the analytics type that is allowed to be requested by the terminal device.

For example, in S560, the terminal device requests a data analytics result from the NWDAF based on the information about the analytics type that is allowed to be requested.

Figure 6:
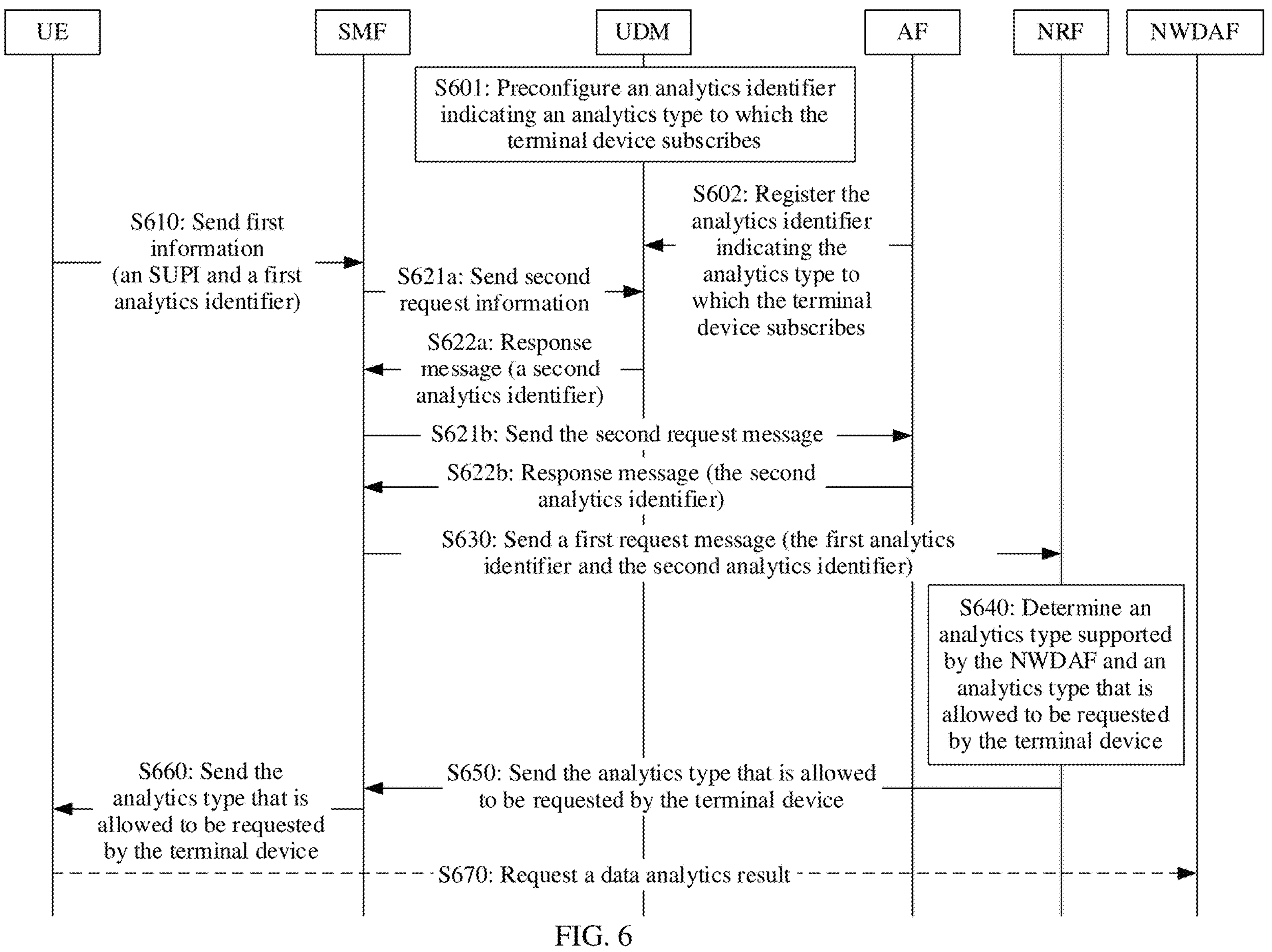
FIG. 6 is a schematic flowchart of a communication method according to another embodiment.

In FIG. 6, an example in which the first network element is a network repository function network element (denoted as an NRF in the following) is used to describe the communication method provided in the embodiments. As shown in FIG. 6, the method includes at least the following steps.

S610: A UE sends first information to an SMF.

The first information includes identification information of a terminal device and information about a type of an analytics result requested by the terminal device. For example, the first information may further include analytics result filtering information. This step is similar to S510, and details are not described herein again.

S620: The SMF obtains information about an analytics type to which the terminal device subscribes.

In a possible implementation, the SMF subscribes to and obtains, from an UDM network element, the information about the analytics type to which the terminal device subscribes, including step S621*a* and step S622*a*. For example, the SMF may further directly obtain, from an AF, the information about the analytics type to which the terminal device subscribes, including step S621*b* and step S622*b*. This process is similar to S520.

Similarly, if the information about the analytics type to which the terminal device subscribes on the UDM or the AF changes, the UDM or the AF may further send information about an updated analytics type to which the terminal device subscribes to the SMF.

S630: The SMF sends a first request message to the NRF, where the first request message carries the information about the analytics type requested by the terminal device and the information about the analytics type to which the terminal device subscribes. Correspondingly, the NRF receives the first request message.

The first request message may further carry at least one of the following information: information about an AOI of the terminal device, or information about a location area in which the terminal device is located.

S640: The NRF discovers an NWDAF that serves the AOI or the location area in which the terminal device is located, and information about an analytics type supported by the NWDAF, and determines information about an analytics type that is allowed to be requested by the terminal device.

The NRF may send a response message to the SMF. The response message may carry the following information: identification information and/or address information of the NWDAF, and the information about the analytics type that is allowed to be requested by the terminal device.

For example, when the information about the analytics type supported by the NWDAF changes, the NRF may re-determine, based on the information about the updated analytics type supported by the NWDAF, the received information about the analytics type requested by the terminal device, and the information about the (updated) analytics type to which the terminal device subscribes, the information about the analytics type that is allowed to be requested by the terminal device.

S650: The NRF sends, to the SMF, the information about the analytics type that is allowed to be requested by the terminal device.

S660: The SMF sends, to the terminal device, the information about the analytics type that is allowed to be requested by the terminal device. Correspondingly, the terminal device receives the information. This step is similar to S560.

For example, in S670, the terminal device requests a data analytics result from the NWDAF based on the analytics type that is allowed to be requested.

According to the method provided in this embodiment, the SMF or the NRF may determine, based on the information about the analytics type requested by the terminal device, the information about the analytics type to which the terminal device subscribes, and the information about the analytics type supported by the NWDAF, the information about the analytics type (a first analytics type) that is allowed to be obtained by the terminal device. The SMF sends the information about the first analytics type to the terminal device, so that the terminal device can obtain a data analytics result from the data analytics network element, and performance of the terminal device can be improved.

Figure 7A:
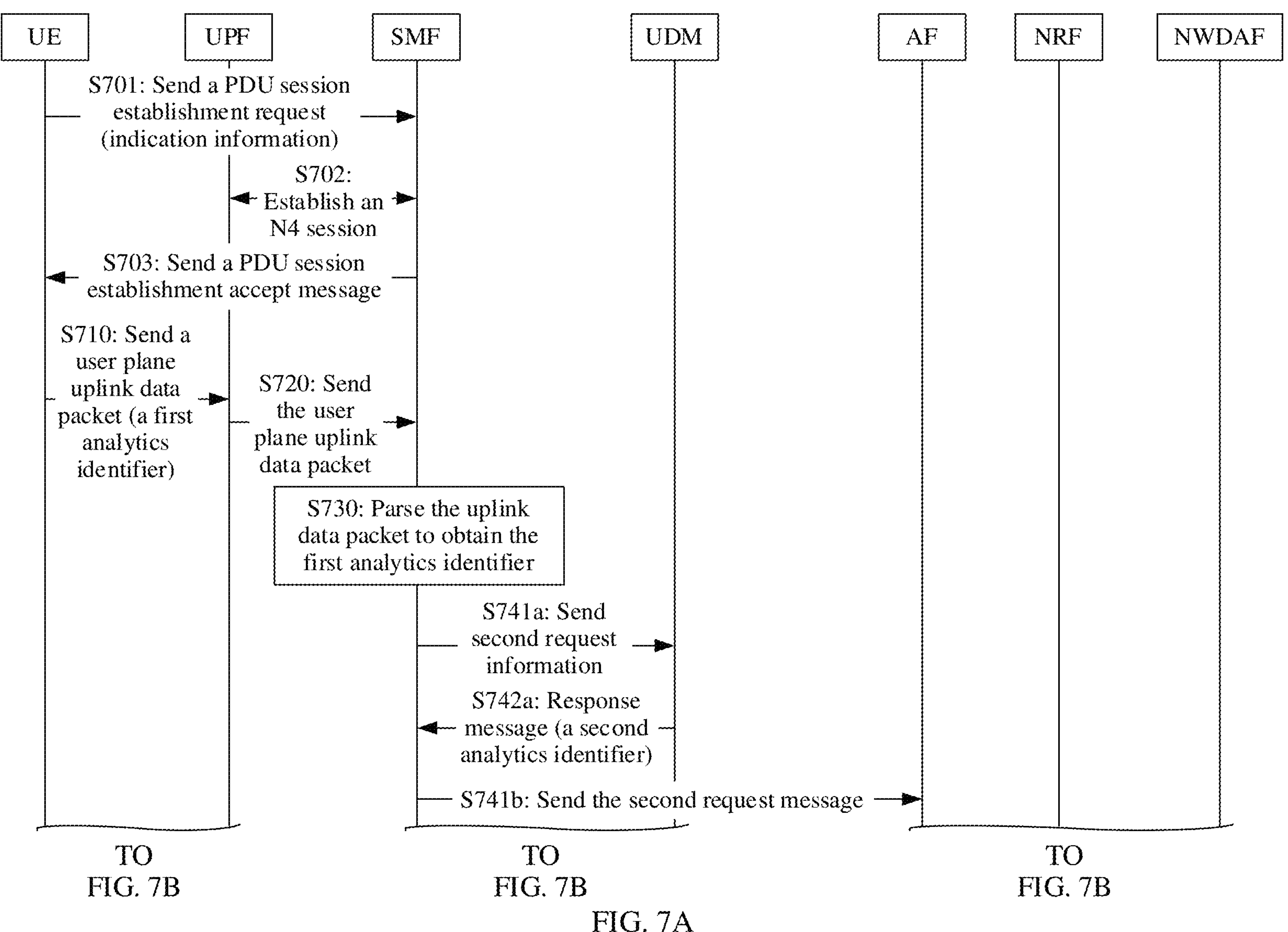
FIG. 7A and FIG. 7B are a schematic flowchart of a communication method according to another embodiment.
Figure 7B:
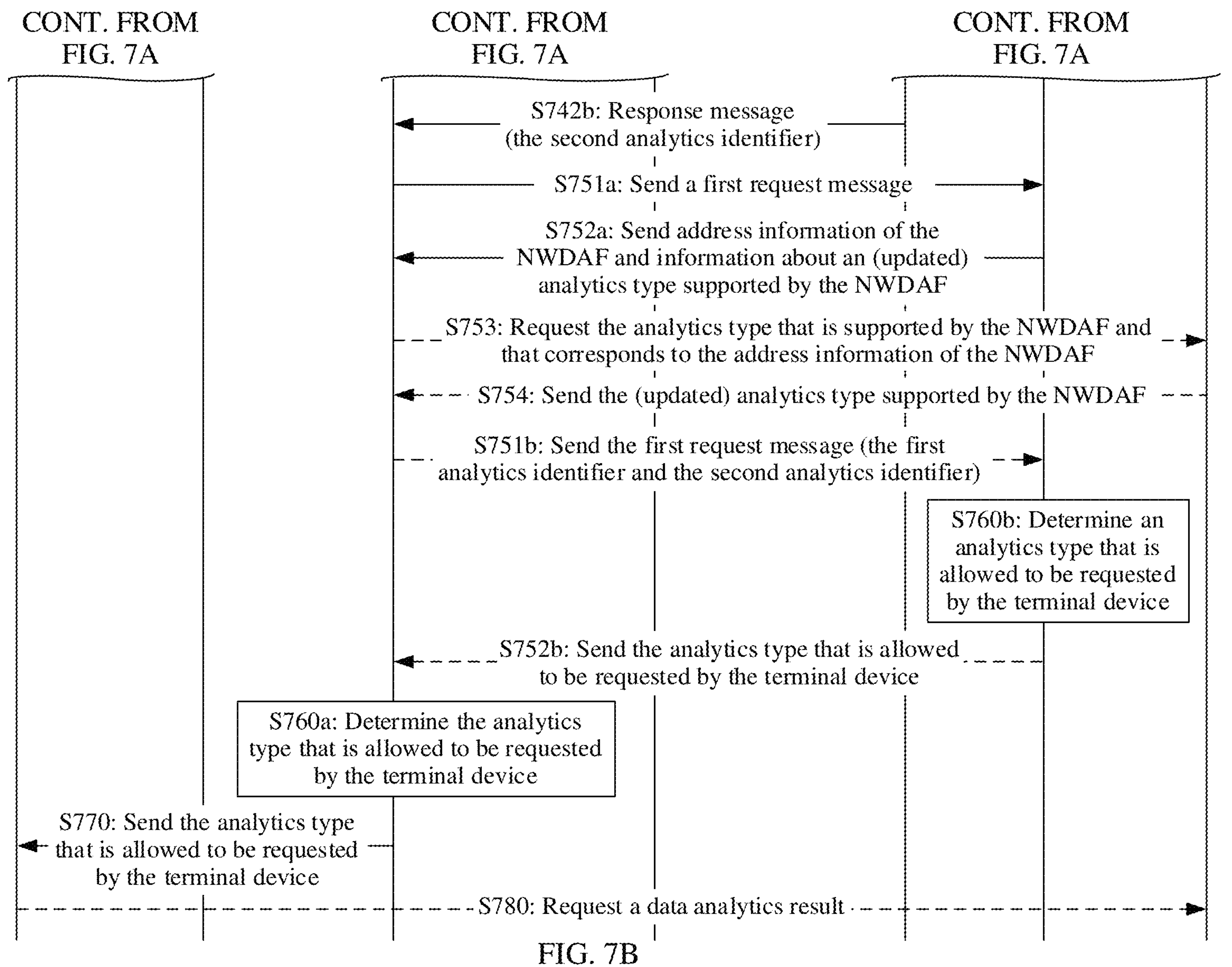

In FIG. 7A and FIG. 7B, an example in which a first network element is a session management network element (denoted as an SMF in the following) is used to describe a communication method provided in embodiments. As shown in FIG. 7A and FIG. 7B, the method includes at least the following steps.

S701: A UE sends a PDU session establishment request message to the SMF.

The PDU session establishment request message includes indication information, and the indication information indicates that the UE sends analytics subscription information via a user plane. For more descriptions of the indication information, refer to S210.

S702: The SMF and an UPF establish an N4 session.

The SMF sends an N4 session establishment request message to the UPF. The N4 session establishment request message includes a PDR corresponding to the analytics subscription information, and the PDR is used to assist the UPF in sending, to the SMF, a user plane uplink data packet that includes the analytics subscription information. For example, the PDR includes a correspondence between a QFI and address information of the SMF, and the QFI is used to identify a QoS flow of a session in which the UE sends the analytics subscription information and receives a data analytics result.

Correspondingly, the UPF sends an N4 session establishment response (N4 session establishment response) message to the SMF.

S703: The SMF sends a PDU session establishment accept message to the UE.

S710: The UE sends a user plane uplink data packet (an example of first information) to the UPF.

The uplink data packet includes a first analytics identifier, and the first analytics identifier is used to identify information about an analytics type requested by the UE.

For example, the user plane uplink data packet may include analytics result filtering information, for example, information about an area of interest AOI of a terminal device.

S720: The UPF forwards the user plane uplink data packet to the SMF based on the PDR and the QFI.

S730: The SMF obtains information about an analytics type requested by the terminal device.

The SMF may parse the uplink data packet and extract the first analytics identifier from the uplink data packet, that is, obtain the information about the analytics type requested by the terminal device.

For example, in step S720, the UPF may first parse the user plane uplink data packet from the UE, extract the first analytics identifier, and then send the first analytics identifier to the SMF. Correspondingly, in step S730, the SMF obtains the first analytics identifier from the UPF, that is, obtains the information about the analytics type requested by the terminal device.

S740: The SMF obtains information about an analytics type to which the terminal device subscribes.

The SMF may subscribe to and obtain, from an UDM network element via a subscription data subscription Nudm_SDM_Subscribe Request service operation, the information about the analytics type to which the terminal device subscribes (including step S741*a* and step S742*a*). This step is similar to S621*a* and S622*a*. For example, the SMF may further directly obtain, from the AF, the information about the analytics type to which the terminal device subscribes (including step S741*b* and step S742*b*). This step is similar to S621*b* and S622*b*.

S750: The SMF obtains information about an analytics type supported by an NWDAF.

The SMF may obtain, via an NRF, the analytics type supported by the NWDAF (including step S751*a* and step S752*a*). This step is similar to S531 and S532. Alternatively, the SMF may directly request, from the NWDAF, the information about the analytics type supported by the NWDAF (including step S753 and step S754). This step is similar to S531 to S534, and details are not described herein again.

S760: The SMF determines information about an analytics type (Allowed Analytics ID) that is allowed to be requested by the terminal device.

This step is similar to S240, and details are not described herein again.

S770: The SMF sends, to the terminal device, the information about the analytics type that is allowed to be requested by the terminal device.

The SMF sends, via the UPF, a user plane downlink data packet to the terminal device, where the user plane downlink data packet carries information about a fourth analytics identifier, and the fourth analytics identifier is used to identify the information about the analytics type that is allowed to be requested by the terminal device. Alternatively, the SMF sends information about a fourth analytics identifier to the UPF, and the UPF encapsulates the information into a user plane downlink data packet and sends the encapsulated user plane downlink data packet to the terminal device.

In step S750, the SMF may further send, to the NRF, the information about the analytics identifier requested by the terminal device and the information about the analytics identifier to which the terminal device subscribes, and the NRF determines the information about the analytics identifier supported by the NWDAF and the fourth analytics identifier (including step S751*b* and step S752*b*, and step S760*b*). Subsequently, the NRF sends the fourth analytics identifier to the SMF, and the SMF sends the fourth analytics identifier to the terminal device.

According to the method provided in this embodiment, the SMF or the NRF network element may determine, based on the information about the analytics type requested by the terminal device, the information about the analytics type to which the terminal device subscribes, and the information about the analytics type supported by the NWDAF, the information about the analytics type (the first analytics type) that is allowed to be obtained by the terminal device, and the SMF network element sends the first analytics type to the terminal device, so that the terminal device can obtain the data analytics result of the NWDAF.

In the communication method shown in FIG. 7A and FIG. 7B, after receiving the user plane uplink data packet, the UPF forwards the user plane uplink data packet or the parsed information about the analytics type requested by the terminal device to the SMF, and the SMF or the NRF determines the information about the analytics type that is allowed to be requested by the terminal device. For example, after receiving the user plane uplink data packet, the UPF may alternatively parse the data packet independently, and determine the information about the analytics type that is allowed to be requested by the terminal device.

Figure 8A:
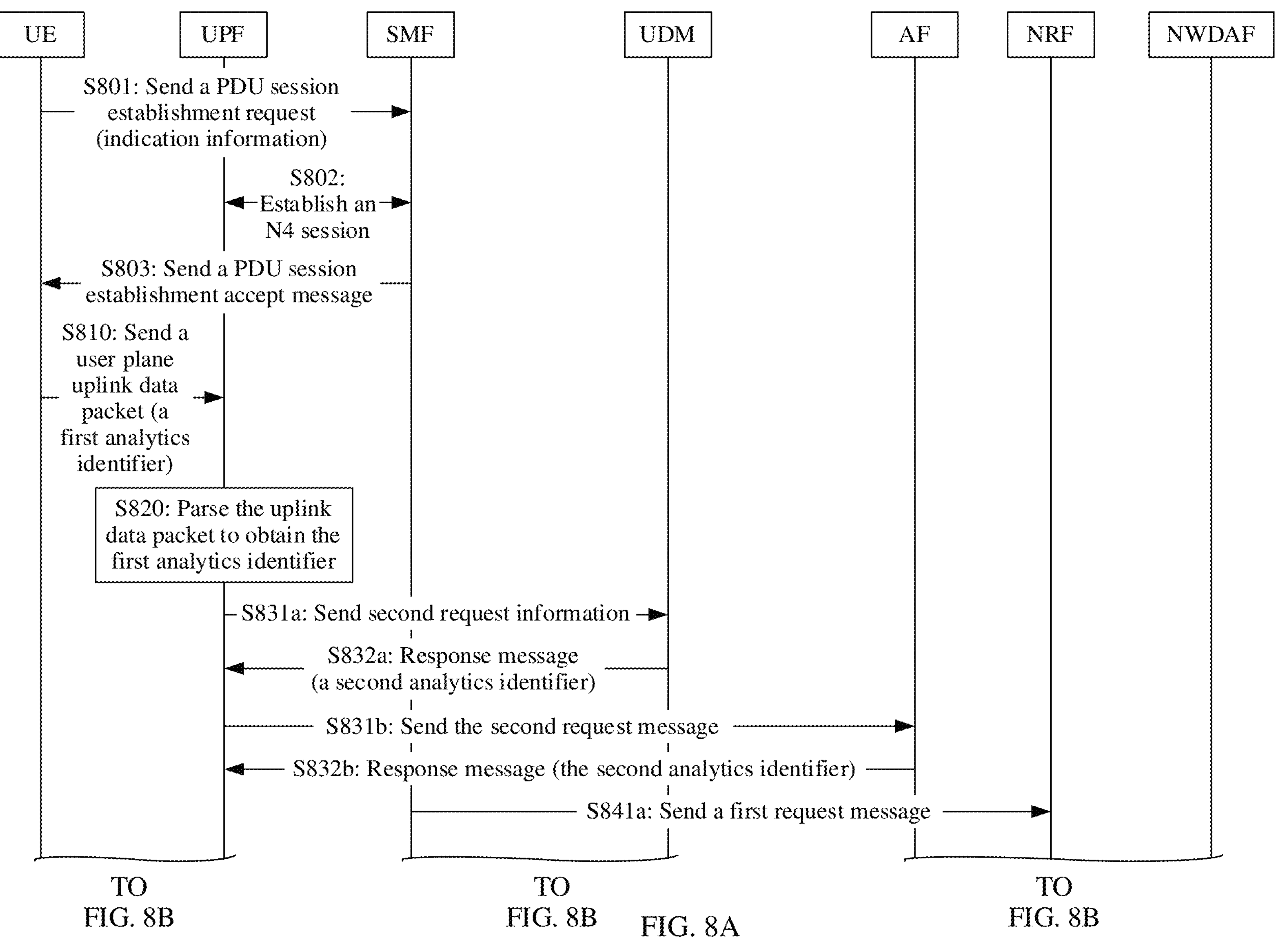
FIG. 8A and FIG. 8B are a schematic flowchart of a communication method according to another embodiment.
Figure 8B:
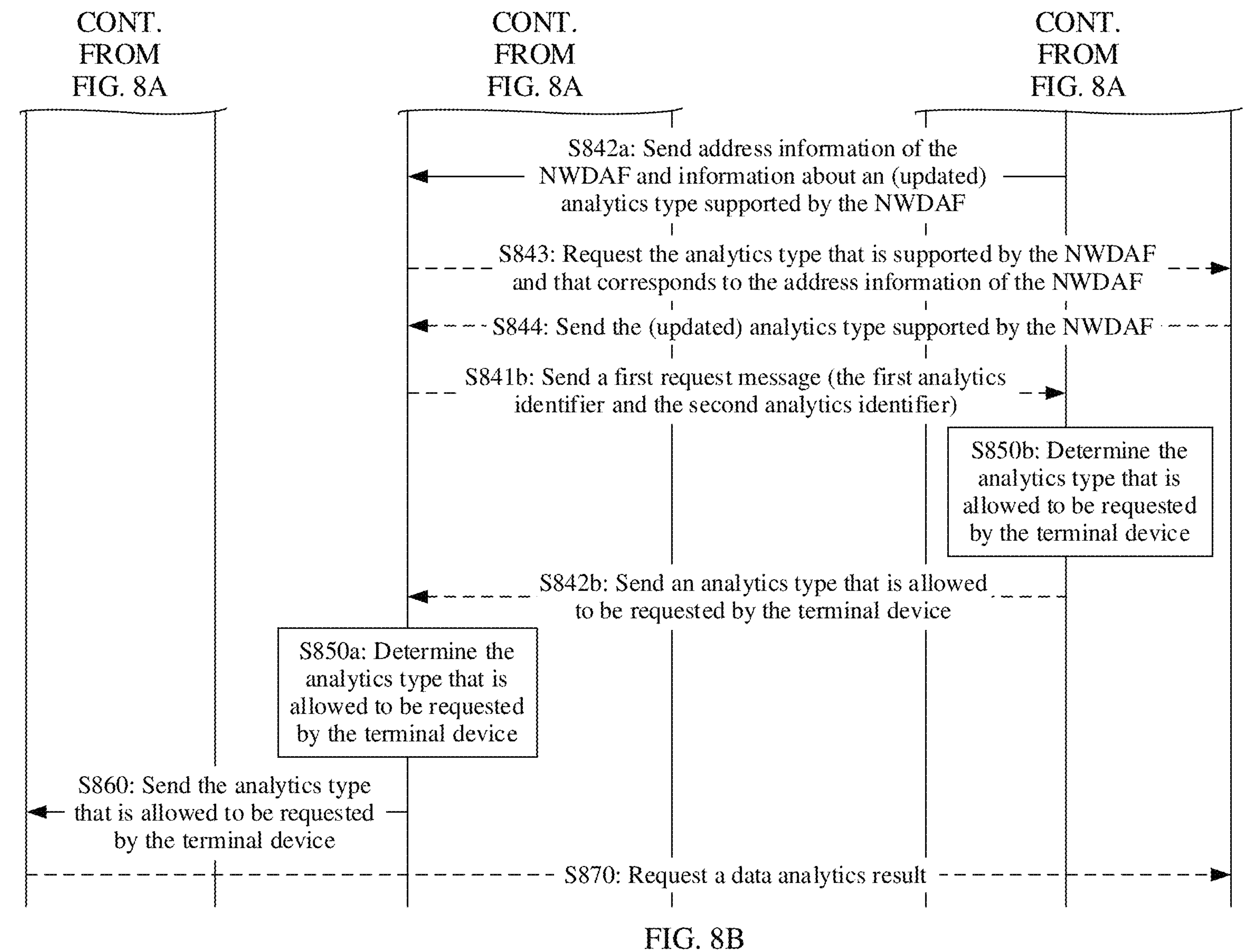

In FIG. 8A and FIG. 8B, an example in which the first network element is a UPF network element is used to describe a communication method provided in an embodiment. The method includes at least the following several steps.

S801: A UE sends a PDU session establishment request message to an SMF.

The PDU session establishment request message includes indication information, and the indication information indicates that the UE sends analytics subscription information via a user plane. This step is similar to S701.

S802: The SMF and an UPF establish an N4 session.

This step is similar to S702.

Correspondingly, the UPF sends an N4 session establishment response (N4 session establishment response) message to the SMF.

S803: The SMF sends a PDU session establishment accept message to the UE.

S810: The UE sends a user plane uplink data packet (an example of first information) to the UPF.

The uplink data packet includes a first analytics identifier, and the first analytics identifier is used to identify information about an analytics type requested by the UE.

For example, the user plane uplink data packet may include analytics result filtering information.

S820: The UPF obtains information about an analytics type requested by a terminal device.

The UPF parses the user plane uplink data packet, extracts the first analytics identifier from the data packet, and obtains the information about the analytics type requested by the terminal device.

S830: The UPF obtains information about an analytics type to which the terminal device subscribes.

Similar to S741*a* and S742*a*, the UPF may subscribe to, from the UDM network element via a subscription data subscription Nudm_SDM_Subscribe Request service operation and obtain information about an (updated) analytics type to which the terminal device subscribes.

For example, similar to S741*b* to S742*b*, the UPF may further directly obtain, from an AF, the information about the (updated) analytics type to which the terminal device subscribes.

S840: The UPF obtains information about an analytics type supported by an NWDAF.

The UPF may obtain, via an NRF, the analytics type supported by the NWDAF (including step S841*a* and step S842*a*). Alternatively, the UPF may directly request, from the NWDAF, the information about the analytics type supported by the NWDAF (including step S843 and step S844). This step is similar to S531 to S534, and details are not described herein again.

S850*a*: The UPF determines information about an analytics type that is allowed to be requested by the terminal device.

This step is similar to S240. Alternatively, the UPF may update, based on the information about the updated analytics type to which the terminal device subscribes, the information about the analytics type supported by the NWDAF, and the information about the analytics type requested by the terminal device, the information about the analytics type that is allowed to be requested by the terminal device.

S860: The UPF sends, to the terminal device by using a user plane downlink data packet, the analytics type that is allowed to be requested by the terminal device.

For example, in S840, the UPF may further send, to the NRF, the information about the analytics type requested by the terminal device and the information about the analytics identifier to which the terminal device subscribes. The NRF determines the information about the analytics type supported by the NWDAF and the information (a fourth analytics identifier) about the analytics type that is allowed to be requested by the terminal device (including step S841*b* and step S842*b*, and step S850*b*). Subsequently, the NRF sends the fourth analytics identifier to the UPF, and the UPF sends the fourth analytics identifier to the terminal device.

For F example, in S870, the terminal device requests a data analytics result from the NWDAF based on the information about the analytics type that is allowed to be requested.

According to the method provided in this embodiment, the UPF or the NRF may determine, based on the information about the analytics type requested by the terminal device, the information about the analytics type to which the terminal device subscribes, and the information about the analytics type supported by the NWDAF, the information about the analytics type (the first analytics type) that is allowed to be requested by the terminal device, and the UPF network element sends the information about the first analytics type to the terminal device, so that the terminal device can obtain the data analytics result from the NWDAF.

Figure 9A:
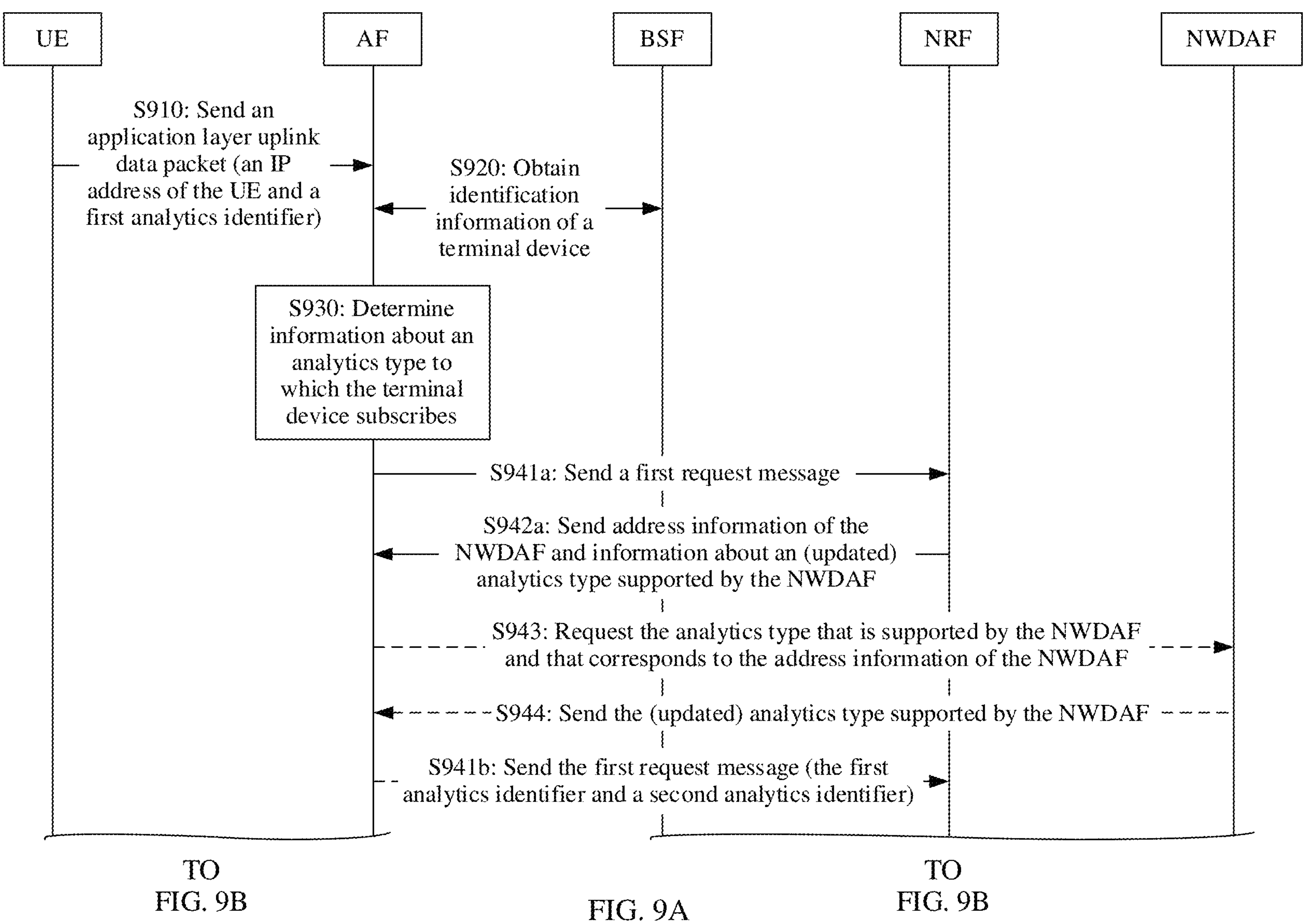
FIG. 9A and FIG. 9B are a schematic flowchart of a communication method according to another embodiment.
Figure 9B:
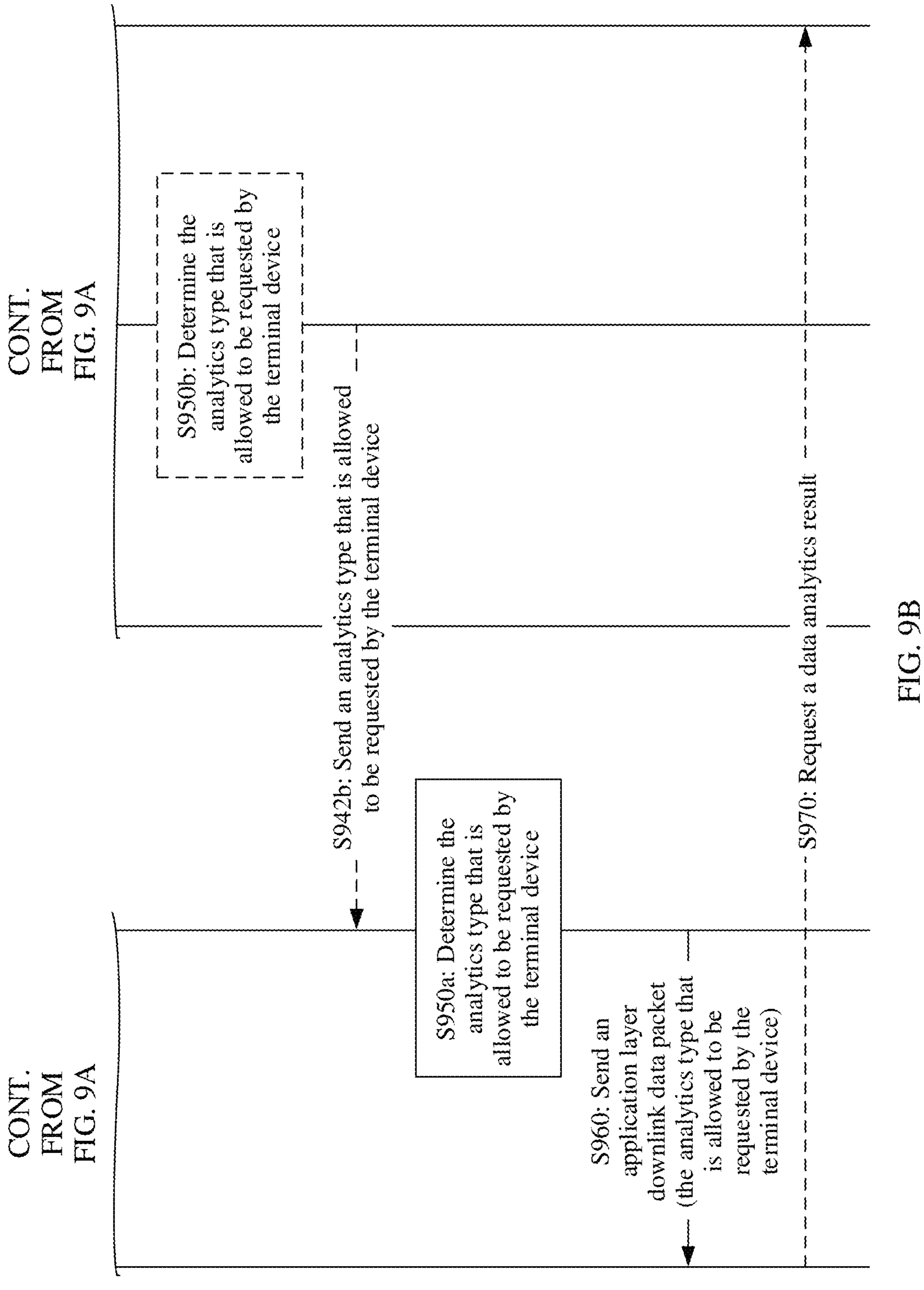

In FIG. 9A and FIG. 9B, an example in which the first network element is an AF network element is used to describe a communication method provided in an embodiment. The method includes at least the following several steps.

S910: An UE sends an application layer uplink data packet (an example of first information) to the AF, where the application layer uplink data packet carries information about an analytics type requested by a terminal device.

The application layer uplink data packet further carries address information of the terminal device, for example, an IP address of the terminal device.

For example, the application layer uplink data packet may further include analytics result filtering information.

S920: The AF obtains identification information of the terminal device.

The AF may obtain the identification information of the terminal device from a binding support function (BSF) based on the address information of the terminal device. For example, the identification information may be an SUPI or a GPSI.

For example, the AF may obtain the identification information of the terminal device from the BSF network element via an NEF.

S930: The AF determines information about an analytics type to which the terminal device subscribes.

The AF may determine, based on the identification information of the terminal device, the information about the analytics type to which the terminal device subscribes, or determine, based on the identification information of the terminal device and identification information of an application, the information about the analytics type to which the terminal device subscribes.

S940: The AF obtains information about an analytics type supported by an NWDAF.

The AF may obtain the analytics type supported by the NWDAF via the NRF. Alternatively, the AF may obtain, directly from the NWDAF, the information about the analytics type supported by the NWDAF. This step is similar to S333, and details are not described herein again.

For example, the AF may further send a subscription request message to the NRF or the NWDAF, to request to send a corresponding notification message when the analytics type supported by the NWDAF changes.

S950*a*: The AF determines information about an analytics type that is allowed to be requested by the terminal device.

This step is similar to S240, and details are not described herein again.

S960: The AF sends, to the terminal device by using an application layer downlink data packet, the information about the analytics type that is allowed to be requested by the terminal device.

In step S940, the AF may further send, to the NRF, the information about the analytics type requested by the terminal device and the information about the analytics type to which the terminal device subscribes. The NRF determines the information about the analytics type supported by the NWDAF and the information (a fourth analytics identifier) about the analytics type that is allowed to be requested by the terminal device. This step is similar to S630. Subsequently, the NRF sends the fourth analytics identifier to the AF, and the AF sends the fourth analytics identifier to the terminal device.

It should be noted that the AF may belong to an operator network or a third party. When the AF belongs to a third party, steps S920 to S940 may be performed via the NEF.

For example, the AF may send a subscription request to the NEF via an Nnef_AnalyticsExposure_Subscribe service operation, to request the information about the analytics type supported by the NWDAF. The NEF may send an Nnwdaf_AnalyticsSubscription_Subscribe service operation to the NWDAF based on the subscription request, to request the information about the analytics type supported by the NWDAF. The NWDAF may send a subscription notification to the AF via the NEF. The subscription notification includes the information about the analytics type supported by the NWDAF.

According to the method provided in this embodiment, the AF or the NRF network element may determine, based on the information about the analytics type requested by the terminal device, the information about the analytics type to which the terminal device subscribes, and the information about the analytics type supported by the NWDAF, the information about the analytics type (the first analytics type) that is allowed to be requested by the terminal device, and the AF sends the information about the first analytics type to the terminal device, so that the terminal device can obtain the data analytics result from the NWDAF.

It should be understood that examples in the embodiments are merely intended to help a person skilled in the art better understand the embodiments but are not intended to limit the scope of the embodiments.

It should be understood that sequence numbers of the foregoing processes do not mean a sequence of performing the processes. The sequence of performing the processes should be determined according to functions and internal logic of the processes and should not be construed as any limitation on the implementation processes of the embodiments.

It should be further understood that, in the embodiments, unless otherwise stated or there is a logic conflict, terms and/or descriptions in different embodiments are consistent and may be mutually referenced, and features in different embodiments may be combined based on an internal logical relationship thereof, to form a new embodiment.

It should be further noted that, in the embodiments, "presetting", "preconfiguring", or the like may be implemented by prestoring corresponding code or a table in a device (for example, a network device), or in another manner that may indicate related information. An implementation of "presetting", "predefining", or the like is not limited, such as a preset rule or a preset constant in the embodiments.

It may be understood that, in the foregoing embodiments, a method implemented by a communication device may be alternatively implemented by a component (for example, a chip or a circuit) that can be disposed inside the communication device.

The communication methods provided in the embodiments are described above in detail with reference to FIG. 2 to FIG. 9A and FIG. 9B. The foregoing communication methods may be described from a perspective of interaction between network elements. It may be understood that to implement the foregoing functions, each network element includes a corresponding hardware structure and/or software module for performing each function. A person skilled in the art should be able to be aware that, in combination with units and algorithm steps of the examples described in embodiments, the embodiments may be implemented by hardware or a combination of hardware and computer software. Whether a function is performed by hardware or hardware driven by computer software depends on particular applications and constraints. A person skilled in the art may use different methods to implement the described functions for each particular application, but it should not be considered that the implementation goes beyond the scope of the embodiments.

Figure 10:
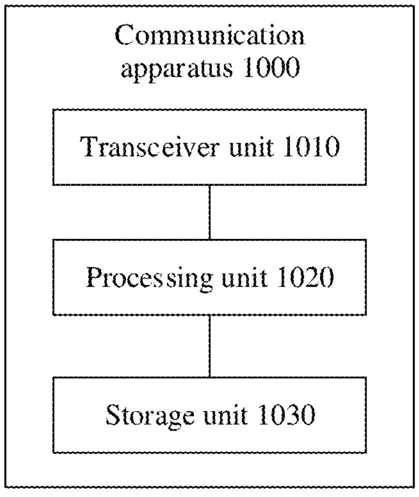
FIG. 10 is a schematic diagram of a communication apparatus according to an embodiment.
Figure 11:
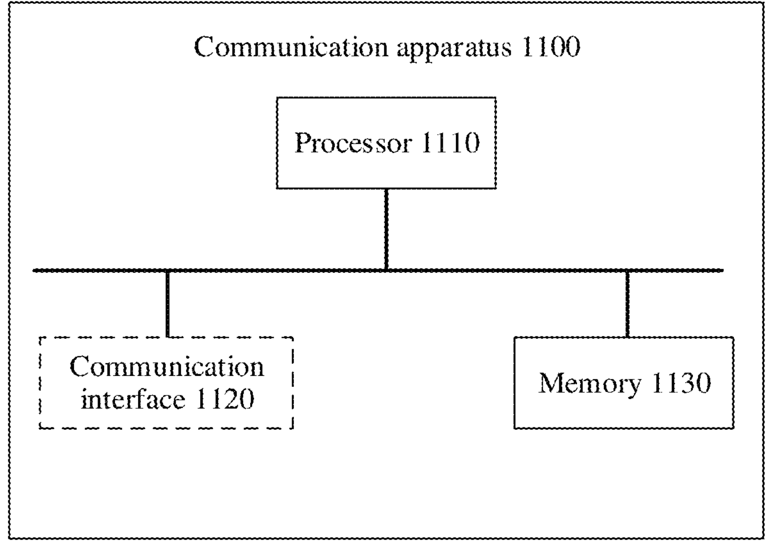
FIG. 11 is a schematic block diagram of a communication apparatus according to another embodiment.
Figure 12:
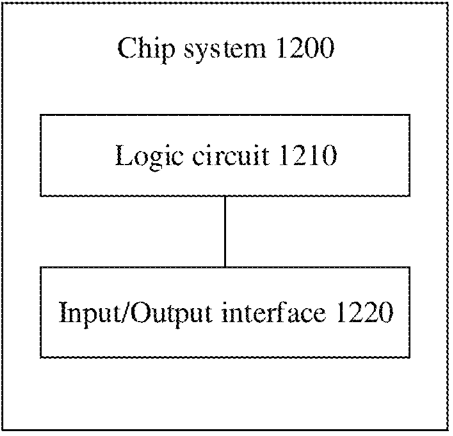
FIG. 12 is a schematic diagram of a chip system according to an embodiment.

The following describes in detail a communication apparatus provided in the embodiments with reference to FIG. 10 to FIG. 12. It should be understood that descriptions of apparatus embodiments correspond to the descriptions of the method embodiments. Therefore, for content that is not described in detail, refer to the foregoing method embodiments. For brevity, some content is not described again.

FIG. 10 is a schematic block diagram of a communication apparatus 1000 according to an embodiment. As shown in the figure, the communication apparatus 1000 may include a transceiver unit 1010 and a processing unit 1020.

The communication apparatus 1000 may be the first network element in the foregoing method embodiments or may be a chip configured to implement the function of the first network element in the foregoing method embodiments.

It should be understood that the communication apparatus 1000 may correspond to the first network element in the method 200, or correspond to the AMF in the method 300, or correspond to the NRF in the method 400, or correspond to the SMF in the method 500 or the method 600 or the method 700, or correspond to the UPF in the method 800, or correspond to the AF in the method 900 according to the embodiments. The communication apparatus 1000 may include a method unit executed by the first network element in the method 200 in FIG. 2, a method unit executed by the AMF in the method 300 in FIG. 3, a method unit executed by the NRF in the method 400 in FIG. 4, a method unit executed by the SMF in the method 500 in FIG. 5 or the method 600 in FIG. 6 or the method 700 in FIG. 7A and FIG. 7B, a method unit executed by the UPF in the method 800 in FIG. 8A and FIG. 8B, or a method unit executed by the AF in the method 900 in FIG. 9A and FIG. 9B. In addition, the units in the communication apparatus 1000 and the foregoing other operations and/or functions are separately intended to implement corresponding procedures of the method 200 in FIG. 2 to the method 800 in FIG. 8A and FIG. 8B. It should be understood that a process in which each unit performs the foregoing corresponding steps is described in detail in the foregoing method embodiments. For brevity, details are not described herein again.

The communication apparatus 1000 may be the terminal device in the foregoing method embodiments. The communication apparatus includes the transceiver unit 1010. Alternatively, the communication apparatus 1000 may be a chip configured to implement functions of the terminal device in the foregoing method embodiments.

It should be understood that the communication apparatus 1000 may correspond to the terminal device in the method 200 to the method 900 according to the embodiments, and the communication apparatus 1000 may include units configured to perform the method performed by the terminal device in the method in FIG. 2 to the method 900 in FIG. 9A and FIG. 9B. In addition, the units in the communication apparatus 1000 and the foregoing other operations and/or functions are separately intended to implement corresponding procedures of the method in FIG. 2 to the method 900 in FIG. 9A and FIG. 9B. It should be understood that a process in which each unit performs the foregoing corresponding steps is described in detail in the foregoing method embodiments. For brevity, details are not described herein again.

The communication apparatus 1000 may be the access and mobility management function network element in the foregoing method embodiments or may be a chip configured to implement a function of the access and mobility management function network element in the foregoing method embodiments.

It should be understood that the communication apparatus 1000 may correspond to the access and mobility management function network element in the method 300 according to the embodiments, and the communication apparatus 1000 may include units configured to perform the method performed by the access and mobility management function network element. In addition, the units in the communication apparatus 1000 and the foregoing other operations and/or functions are separately intended to implement corresponding procedures of the method 300 in FIG. 3. It should be understood that a process in which each unit performs the foregoing corresponding steps is described in detail in the foregoing method embodiments. For brevity, details are not described herein again.

The communication apparatus 1000 may be the network repository function network element in the foregoing method embodiments or may be a chip configured to implement a function of the network repository function network element in the foregoing method embodiments.

The communication apparatus 1000 may correspond to the network repository function network element in the method 400 according to the embodiments, and the communication apparatus 1000 may include units configured to perform the method performed by the network repository function network element. In addition, the units in the communication apparatus 1000 and the foregoing other operations and/or functions are separately intended to implement corresponding procedures of the method 400 in FIG. 4. It should be understood that a process in which each unit performs the foregoing corresponding steps is described in detail in the foregoing method embodiments. For brevity, details are not described herein again.

The communication apparatus 1000 may be the session management network element in the foregoing method embodiments or may be a chip configured to implement a function of the session management network element in the foregoing method embodiments.

The communication apparatus 1000 may correspond to the session management network element in the method 500, the method 600, and the method 700 according to the embodiments, and the communication apparatus 1000 may include units configured to perform the method performed by the session management network element. In addition, the units in the communication apparatus 1000 and the foregoing other operations and/or functions are separately intended to implement corresponding procedures of the method 500, the method 600, and the method 700 in FIG. 9. It should be understood that a process in which each unit performs the foregoing corresponding steps is described in detail in the foregoing method embodiments. For brevity, details are not described herein again.

The communication apparatus 1000 may be the user plane function network element in the foregoing method embodiments or may be a chip configured to implement a function of the user plane function network element in the foregoing method embodiments.

The communication apparatus 1000 may correspond to the user plane function network element in the method 800 according to the embodiments, and the communication apparatus 1000 may include units configured to perform the method performed by the user plane function network element in the method 800 in FIG. 8A and FIG. 8B. In addition, the units in the communication apparatus 1000 and the foregoing other operations and/or functions are separately intended to implement corresponding procedures in FIG. 8A and FIG. 8B. It should be understood that a process in which each unit performs the foregoing corresponding steps is described in detail in the foregoing method embodiments. For brevity, details are not described herein again.

The communication apparatus 1000 may be the application function network element in the foregoing method embodiments or may be a chip configured to implement a function of the application function network element in the foregoing method embodiments.

The communication apparatus 1000 may correspond to the application function network element in the method 900 according to the embodiments, and the communication apparatus 1000 may include units configured to perform the method performed by the application function network element in the method 900 in FIG. 9A and FIG. 9B. In addition, the units in the communication apparatus 1000 and the foregoing other operations and/or functions are separately intended to implement a corresponding procedure of the method 900 in FIG. 9A and FIG. 9B. It should be understood that a process in which each unit performs the foregoing corresponding steps is described in detail in the foregoing method embodiments. For brevity, details are not described herein again.

It should be further understood that the transceiver unit 1010 in the communication apparatus 1000 may correspond to a communication interface 1120 in a communication device 1100 shown in FIG. 11. The processing unit 1020 in the communication apparatus 1000 may correspond to a processor 1110 in the communication device 1100 shown in FIG. 11.

It should be further understood that when the communication apparatus 1000 is a chip, the chip includes a transceiver unit. For example, the chip may further include a processing unit. The transceiver unit may be an input/output circuit or a communication interface. The processing unit may be a processor integrated on the chip, a microprocessor, or an integrated circuit.

The transceiver unit 1010 is configured to implement a signal receiving and sending operation of the communication apparatus 1000, and the processing unit 1020 is configured to implement a signal processing operation of the communication apparatus 1000.

For example, the communication apparatus 1000 further includes a storage unit 1030, and the storage unit 1030 is configured to store instructions.

FIG. 11 is a schematic block diagram of a communication device 1100 according to an embodiment. As shown in FIG. 11, the communication device 1100 includes at least one processor 1110 and the communication interface 1120. The processor 1110 is coupled to the memory and is configured to execute instructions stored in the memory, to control the communication interface 1120 to send a signal and/or receive a signal. For example, the communication device 1100 further includes a memory 1130, configured to store instructions.

It should be understood that the processor 1110 and the memory 1130 may be combined into one processing apparatus, and the processor 1110 is configured to execute program code stored in the memory 1130 to implement the foregoing functions. In implementation, the memory 1130 may alternatively be integrated into the processor 1110 or may be independent of the processor 1110.

It should be further understood that the communication interface 1120 may include a receiver (or referred to as a receiving machine) and a transmitter (or referred to as a transmitting machine). The communication interface 1120 may further include an antenna and there may be one or more antennas. The communication interface 1120 may alternatively be an interface circuit.

When the communication device 1100 is a chip, the chip includes a transceiver unit and a processing unit. The transceiver unit may be an input/output circuit or a communication interface. The processing unit may be a processor integrated on the chip, a microprocessor, or an integrated circuit.

FIG. 12 is a schematic diagram of a chip system according to an embodiment. The chip system herein may also be a system composed of circuits. The chip system 1200 shown in FIG. 12 includes: a logic circuit 1210 and an input/output interface (input/output interface) 1220, where the logic circuit may be coupled to the input interface, and transmit data (for example, first indication information) via the input/output interface, to perform the methods in FIG. 2 to FIG. 9A and FIG. 9B.

An embodiment further provides a processing apparatus including a processor and an interface. The processor may be configured to perform the methods in the foregoing method embodiments.

It should be understood that the processing apparatus may be a chip. For example, the processing apparatus may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an implementation process, steps in the foregoing methods may be completed by using an integrated logic circuit of hardware in the processor or by using instructions in a form of software. Steps of the methods provided with reference to the embodiments may be directly executed and accomplished by a hardware processor or may be executed and accomplished by using a combination of hardware and software modules in the processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps of the foregoing method in combination with hardware of the processor. To avoid repetition, details are not described herein again.

It should be noted that, the processor in the embodiments may be an integrated circuit chip and has a signal processing capability. In an implementation process, steps in the foregoing method embodiments may be completed by using an integrated logic circuit of hardware in the processor or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or execute the methods, steps, and logical block diagrams in the embodiments. The general-purpose processor may be a microprocessor, or the processor may be any conventional processor or the like.

It may be understood that the memory in the embodiments may be a volatile memory or a non-volatile memory or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache.

According to the method provided in the embodiments, the embodiments further provide a computer program product, where the computer program product includes: computer program code. When the computer program code runs on a computer, the computer is enabled to perform the method in any one of the embodiments shown in FIG. 2 to FIG. 9A and FIG. 9B.

Based on the methods provided in the embodiments, the embodiments further provide a non-transitory computer-readable storage medium. The non-transitory computer-readable medium stores program code. When the program code is run on a computer, the computer is enabled to perform the method in any one of embodiments shown in FIG. 2 to FIG. 9A and FIG. 9B.

According to the method provided in the embodiments, the embodiments further provide a communication system, including the first network element and the terminal device. For example, the communication system may include a unified data management network element (a second network element).

According to the method provided in the embodiments, the embodiments further provide a communication system, including the foregoing access and mobility management function network element, the session management network element, the user plane function network element, the application function network element, and the terminal device.

A person of ordinary skill in the art may be aware that, in combination with the examples described in the embodiments, units and algorithm steps can be implemented by electronic hardware or a combination of computer software and electronic hardware. Whether the functions are performed by hardware or software depends on particular applications and constraints. A person skilled in the art may use different methods to implement the described functions for each particular application, but it should not be considered that the implementation goes beyond the scope of the embodiments.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments, it should be understood that the system, apparatus, and method may be implemented in other manners. For example, the described apparatus embodiment is merely an example. For example, division into units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented via some interfaces. The indirect couplings or communication connections between the apparatuses or units may be implemented in electrical, mechanical, or other forms.

The units described as separate components may or may not be physically separate, and parts displayed as units may or may not be physical units, may be located in one place, or may be distributed on a plurality of network units. Some or all of the units may be selected based on actual requirements to achieve the objectives of the embodiments.

In addition, function units in the embodiments may be integrated into one processing unit, or each of the units may exist alone physically, or two or more units may be integrated into one unit.

When the functions are implemented in a form of a software functional unit and sold or used as an independent product, the functions may be stored in a non-transitory computer-readable storage medium. Based on such an understanding, the embodiments may be implemented in a form of a software product. The computer software product is stored in a non-transitory storage medium and includes several instructions for instructing a computer device (which may be a personal computer, a server, a network device, or the like) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely embodiments, but are not intended to limit the scope of the embodiments. Any variation or replacement readily figured out by a person skilled in the art shall fall within the scope of the embodiments.

What is claimed is:

1. A method comprising:

obtaining, by a first network element, information about an analytics type requested by a terminal device;

obtaining, by the first network element, information about an analytics type to which the terminal device subscribes;

obtaining, by the first network element, information about an analytics type supported by a data analytics network element;

determining, by the first network element, information about an analytics type that is allowed to be requested by the terminal device based on the information about the analytics type requested by the terminal device, the information about the analytics type to which the terminal device subscribes, and the information about the analytics type supported by the data analytics network element; and sending, by the first network element to the terminal device, the information about the analytics type that is allowed to be requested by the terminal device.

2. The method according to claim 1, wherein the first network element is an access and mobility management function network element, a session management function network element, a user plane function network element, or an application function network element, and the method further comprises:

sending, by the first network element, a first request message to a network repository function network element, wherein the first request message is used to request information about a data analytics network element, the first request message comprises information about an area of interest of the terminal device and/or information about a location area in which the terminal device is located, and a service area of the data analytics network element comprises the area of interest and/or the location area in which the terminal device is located; and obtaining, by the first network element, the information about the analytics type supported by the data analytics network element further comprises:

receiving, by the first network element, the information about the data analytics network element from the network repository function network element, wherein the information about the data analytics network element comprises the information about the analytics type supported by the data analytics network element.

3. The method according to claim 1, wherein the first network element is an access and mobility management function network element, a session management function network element, a user plane function network element, or an application function network element, and the method further comprises:

sending, by the first network element, a first request message to a network repository function network element, wherein the first request message is used to request information about a data analytics network element, the first request message comprises information about an area of interest of the terminal device and/or information about a location area in which the terminal device is located, and a service area of the data analytics network element comprises the area of interest and/or the location area in which the terminal device is located; and receiving, by the first network element, the information about the data analytics network element from the network repository function network element, wherein the information about the data analytics network element comprises address information of the data analytics network element; and obtaining, by the first network element, the information about the analytics type supported by the data analytics network element further comprises:

obtaining, by the first network element from the data analytics network element based on the address information, the information about the analytics type supported by the data analytics network element.

4. The method according to claim 1, wherein the first network element is an access and mobility management function network element, a session management function network element, or a user plane function network element, and the obtaining, by the first network element, information about an analytics type to which the terminal device subscribes comprises:

sending, by the first network element, a second request message to a unified data management network element or an application function network element, wherein the second request message is used to request subscription data of the terminal device, and the second request message comprises identification information of the terminal device; and receiving, by the first network element from the unified data management network element or the application function network element, the information about the analytics type to which the terminal device subscribes.

5. The method according to claim 4, wherein the first network element is a session management function network element or a user plane function network element, the second request message further comprises identification information of an application of the terminal device, and the information that is received by the first network element and that is about the analytics type to which the terminal device subscribes corresponds to the identification information of the application of the terminal device.

6. The method according to claim 1, wherein the first network element is a network repository function network element, and obtaining, by the first network element, the information about the analytics type requested by the terminal device and obtaining, by the first network element, the information about the analytics type to which the terminal device subscribes further comprises:

obtaining, by the first network element, a first request message from an access and mobility management function network element, a session management function network element, a user plane function network element, or an application function network element, wherein the first request message comprises the information about the analytics type requested by the terminal device and the information about the analytics type to which the terminal device subscribes.

7. The method according to claim 6, wherein the first request message further comprises information about an area of interest of the terminal device and/or information about a location area in which the terminal device is located, and obtaining, by the first network element, the information about the analytics type supported by the data analytics network element further comprises:

determining, by the first network element, the data analytics network element based on the information about the area of interest of the terminal device and/or the information about the location area in which the terminal device is located, wherein a service area of the data analytics network element comprises the area of interest and/or the location area in which the terminal device is located; and determining, by the first network element, the information about the analytics type supported by the data analytics network element.

8. The method according to claim 1, wherein the first network element is a session management function network element, and obtaining, by the first network element, the information about the analytics type requested by the terminal device further comprises:

obtaining, by the first network element via a user plane function network element, the information about the analytics type requested by the terminal device.

9. The method according to claim 8, wherein before the obtaining, by the first network element via the user plane function network element, the information about the analytics type requested by the terminal device, the method further comprises:

receiving, by the first network element, indication information from the terminal device, wherein the indication information indicates that the information about the analytics type requested by the terminal device is carried in a user plane uplink data packet; and sending, by the first network element, a packet detection rule corresponding to the user plane uplink data packet to the user plane function network element based on the indication information.

10. The method according to claim 1, wherein the first network element is an application function network element, and obtaining, by the first network element, the information about the analytics type requested by the terminal device further comprises:

receiving, by the first network element, an application layer uplink data packet from the terminal device, wherein the application layer uplink data packet comprises the information about the analytics type requested by the terminal device.

11. The method according to claim 10, wherein the application layer uplink data packet further comprises Internet protocol (IP) address information of the terminal device, and obtaining, by the first network element, the information about the analytics type to which the terminal device subscribes further comprises:

obtaining, by the first network element, identification information of the terminal device from a binding support function network element based on the IP address information; and determining, by the first network element based on the identification information of the terminal device, the information about the analytics type to which the terminal device subscribes.

12. The method according to claim 11, wherein sending, by the first network element to the terminal device, the information about the analytics type that is allowed to be requested by the terminal device further comprises:

sending, by the first network element, an application layer downlink data packet to the terminal device, wherein the application layer downlink data packet comprises the information about the analytics type that is allowed to be requested by the terminal device.

* * * * *